(12) United States Patent
Iijima

(10) Patent No.: US 6,797,210 B2
(45) Date of Patent: Sep. 28, 2004

(54) FUNCTIONAL FILM HAVING FUNCTIONAL LAYER AND ARTICLE PROVIDED WITH FUNCTIONAL LAYER

(75) Inventor: Tadayoshi Iijima, Saku (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/445,062

(22) Filed: May 27, 2003

(65) Prior Publication Data

US 2003/0180521 A1 Sep. 25, 2003

Related U.S. Application Data

(63) Continuation of application No. 09/858,504, filed on May 17, 2001, now abandoned.

(30) Foreign Application Priority Data

| May 19, 2000 | (JP) | 2000-148826 |
| May 19, 2000 | (JP) | 2000-148827 |
| May 19, 2000 | (JP) | 2000-149051 |
| Jan. 22, 2001 | (JP) | 2001-013587 |
| Mar. 22, 2001 | (JP) | 2001-082787 |

(51) Int. Cl.[7] ............................................. B29C 43/20
(52) U.S. Cl. ..................... 264/112; 264/113; 264/123
(58) Field of Search ................................. 264/109, 112, 264/113, 123

(56) References Cited

U.S. PATENT DOCUMENTS

| 5,411,792 A | 5/1995 | Yukinobu et al. |
| 5,421,926 A | 6/1995 | Yukinobu et al. |
| 5,747,152 A | 5/1998 | Oka et al. |
| 5,976,297 A | 11/1999 | Oka et al. |
| 2001/0008717 A1 * | 7/2001 | Iijima .......................... 428/702 |
| 2002/0051879 A1 * | 5/2002 | Tamai et al. ................. 428/336 |

FOREIGN PATENT DOCUMENTS

| EP | 0 656 258 A2 B1 | 6/1995 |
| EP | 100319A2 B1 | 5/2000 |
| JP | 50-96128 | 7/1975 |
| JP | 55012107A B1 | 1/1980 |
| JP | 59116601A B1 | 7/1984 |
| JP | 06-231396 B1 | 11/1985 |
| JP | 60-233895 B1 | 11/1985 |
| JP | 02106097A B1 | 4/1990 |
| JP | 04237908A B1 | 8/1992 |
| JP | 7-225302 B1 | 8/1995 |
| JP | 08187997A B1 | 7/1996 |
| JP | 08199096A B1 | 8/1996 |
| JP | 09109259 A | 4/1997 |
| JP | 11203942 A | 7/1999 |
| JP | 2000-109341 B1 | 4/2000 |

* cited by examiner

Primary Examiner—Mary Lynn Theisen
(74) Attorney, Agent, or Firm—Rader, Fishman & Grauer PLLC

(57) ABSTRACT

The present invention provides a functional film for transfer, by means of the application method, having a functional layer capable of exhibiting various functions, for example, a transparent conductive layer being low in electric resistance value, an article provided with the functional layer, and a method for producing the article provided with the functional layer.

A functional film at least having a functional layer (4) on a support (1), said functional layer being releasable from the support (1), wherein the functional layer (4) is a compressed layer of functional fine particles. The compressed layer of the functional fine particles is obtained by applying a liquid in which the functional fine particles are dispersed onto the support (1) followed by drying to form a layer containing the functional fine particles, and compressing the layer containing the functional fine particles. The present invention has an advantage in the case in which a functional layer with uniform thickness is provided to an article being poor in flexibility such as plate materials.

18 Claims, 7 Drawing Sheets

(a)

(b)

(c)

FUNCTIONAL FILM HAVING FUNCTIONAL LAYER AND ARTICLE PROVIDED WITH FUNCTIONAL LAYER

This application is a continuation of Ser. No. 09/858,504 filed May 17, 2001, now abandoned.

BACKGROUND OF THE INVENTION

1. Field of the Invention

The present invention relates to a functional film for transfer having a functional layer comprising a compressed layer of functional fine particles on a support, an article provided with the functional layer, and a method for producing the article provided with the functional layer.

The present invention relates to a functional film for transfer having a functional layer comprising a compressed layer of functional fine particles on a support subjected to non-glare treatment, and more particularly to a functional film for transfer capable of providing a functional layer comprising a compressed layer of functional fine particles to an object article and applying non-glare treatment to the object article. Also, the present invention relates to an article provided with the functional layer and subjected to the non-glare treatment, and a method for producing the same.

In the present invention, the functional film includes both a functional film and a functional sheet. In addition, the functional film of the present invention includes a functional film in which a support is a metal.

The functional layer is a layer having a function, and the function means an action accomplished through physical and/or chemical phenomena. The functional layer includes layers having various functions, such as a conductive layer, an ultraviolet shielding layer, an infrared shielding layer, a magnetic layer, a ferromagnetic layer, a dielectric layer, a ferroelectric layer, an electrochromic layer, an electroluminescent layer, an insulating layer, a light-absorbing layer, a light selecting absorbing layer, a reflecting layer, a reflection preventing layer, a catalyst layer, a photocatalyst layer and others.

Particularly, the present invention relates to a functional film for transfer having a transparent conductive layer. In particular, the present invention relates to a functional film for transfer capable of being used for articles, represented by various displays, in which non-glare treatment is required, and more specifically to a functional film for transfer capable of providing a transparent conductive layer to an object article and applying non-glare treatment to the object article. The transparent conductive layer can be used as a transparent electrode such as an electroluminescence panel electrode, an electrochromic element electrode, a liquid crystal electrode, a transparent plane heater, or a touch panel, and can be also used as a transparent electromagnetic-wave shielding layer.

2. Disclosure of the Related Art

Hitherto, functional layers made of various functional materials are produced by the physical vapor deposition method (PVD) such as vacuum vapor deposition, laser ablation, sputtering, or ion plating, or by the chemical vapor deposition method (CVD) such as heat CVD, light CVD, or plasma CVD. These generally require a large-scale apparatus, and among these, some are not suited for forming a layer of large area.

Also, a process is known in which a layer is formed by application using the sol-gel method. The sol-gel method is suited for forming a layer of large area, but in most cases, inorganic materials must be sintered at a high temperature after the application.

For example, with respect to a transparent conductive layer, the following description can be made. At present, the transparent conductive layer is produced mainly by the sputtering method. There are various modes for the sputtering method, for example, a method of forming a layer by allowing inert gas ions, which are generated by direct current or high-frequency discharge, to be accelerated to hit the surface of a target in vacuum so as to strike out atoms constituting the target from the surface for deposition on the substrate surface.

The sputtering method is excellent in that a conductive layer having a low surface electric resistance can be formed even if it has a large area to some extent. However, it has a disadvantage that the apparatus is large, and the layer forming speed is slow. If the conductive layer is to have a still larger area from now on, the apparatus will be further enlarged. This raises a technical problem such that the controlling precision must be heightened and, from another point of view, raises a problem of increase in the production cost. Further, although the number of targets is increased to raise the speed in order to compensate for the slowness of the layer forming speed, this also is a factor that enlarges the apparatus, thereby raising a problem.

An attempt is made to produce the transparent conductive layer by the application method. In a conventional application method, a conductive paint having conductive fine particles dispersed in a binder solution is applied onto a substrate, dried, and hardened to form the conductive layer. The application method has advantages in that a conductive layer having a large area can be easily formed, that the apparatus is simple and has a high productivity, and that the conductive layer can be produced at a lower cost than by the sputtering method. In the application method, an electric path is formed by contact of the conductive fine particles with each other, whereby the electric conductivity is exhibited. However, the conductive layer produced by the conventional application method has an insufficient contact, and the obtained conductive layer has a high electric resistance value (i.e. is inferior in conductivity), thereby limiting its usage.

As the production of the transparent conductive layer by the conventional application method, Japanese Laid-open Patent Publication No. 9-109259 (1997) discloses a production method comprising the first step of applying a paint comprising conductive powders and binder resins onto a plastic film for transfer and drying it to form a conductive layer, the second step of pressing (5 to 100 kg/cm$^2$) the conductive layer surface on a smooth surface and heating (70 to 180° C.), and the third step of laminating this conductive layer on a plastic film or sheet and heat-press-bonding it.

In this method, a large amount of binder resins is used (100 to 500 parts by weight of conductive powders with respect to 100 parts by weight of the binder in the case of inorganic conductive powders; or 0.1 to 30 parts by weight of conductive powders with respect to 100 parts by weight of the binder in the case of organic conductive powders), so that a transparent conductive layer having a low electric resistance value cannot be obtained.

For example, Japanese Laid-open Patent Publication No. 8-199096 (1996) discloses a method in which a conductive layer forming paint comprising tin-doped indium oxide (ITO) powders, a solvent, a coupling agent and an organic or inorganic acid salt of metal, and not containing a binder is applied onto a glass plate and calcined at a temperature of 300° C. or higher. In this method, since the binder is not used, the conductive layer has a low electric resistance value. However, since the calcining step at a temperature of 300° C. or higher must be carried out, it is difficult to form the conductive layer on a support such as a resin film. In other words, the resin film will be melted, carbonized, or burnt by the high temperature. Although it depends on a kind of the resin film, a temperature of 130° C. may be a limit in the case of polyethylene terephthalate (PET) film, for example.

By the application method, in the case that the support is one having flexibility such as a film, a functional layer having a large area can be easily formed. However, in the case that the support is one having poor flexibility such as a plate material, the application is difficult as compared with the case of the flexible support, and particularly it is difficult to control a layer thickness for uniformity.

Namely, in the case of the flexible film, the application can be performed by fixing a coater section and moving the film, thereby easily controlling a layer thickness. On the other hand, in the case of the plate material having poor flexibility, although the application can be performed by moving the plate material if the application area is small, accuracy of the layer thickness is liable to deteriorate due to a wobbling or others by moving the plate material if the application area is large. Also, although a method moving the coater section may be mentioned, accuracy of the layer thickness deteriorates if flatness of the plate material is poor.

For forming a functional layer on a support or article having poor flexibility, a method transferring a functional layer formed on a flexible film to the support or article having poor flexibility may be considered.

For example, Japanese Laid-open Patent Publication No. 60-231396 (1985), Japanese Laid-open Patent Publication No. 60-233895 (1985) and Japanese Laid-open Patent Publication No. 2-106097 (1990) disclose forming a conductive layer on a flexible support and transferring the conductive layer from the support to a substrate having poor flexibility. However, according to these Publications, formation of the conductive layer on the flexible support is performed by the sputtering method or the vapor deposition method. The sputtering method has the problems described above and the vapor deposition method also has the same problems.

In the meantime, there are cases in which providing a functional layer to a support or an article and further applying non-glare treatment (also referred to as anti-glare treatment) to the surface thereof are required. For example, various displays represented by a Braun tube (CRT) are mentioned. In a front surface of the Braun tube, formation of a conductive layer is required in order to obtain antistatic properties and electromagnetic-wave shielding, and further, formation of a non-glare layer on the conductive layer is desired in order to reduce reflection of external light. Also, for a PDP (plasma display panel), near-infrared shielding, a color-correcting layer and the like are required in addition to the requirement of the electromagnetic-wave shielding, and a non-glare layer is also desired.

Hitherto, the non-glare treatment has been performed by, for example, a method dispersing silica particles in a binder and applying it onto a glass surface to be treated, a method spraying abrasive grains to a glass surface to be treated, or a method etching a glass surface to be treated using fluorine (for example, Japanese Laid-open Patent Publication No. 50-96128 (1975), Japanese Laid-open Patent Publication No. 55-12107 (1980) or Japanese Laid-open Patent Publication No. 59-116601 (1984)). By these methods, steps for production increase.

Japanese Laid-open Patent Publication No. 8-187997 (1996) discloses that non-glare treatment is applied to a surface of a display case using a transfer sheet. However, there is no description with regard to providing a functional layer simultaneously.

From these backgrounds, it is desired to develop a method in which a functional layer capable of exhibiting various functions, for example, a transparent conductive layer being low in electric resistance value, is obtained while utilizing the advantages of the application method that a functional layer of large area can be easily formed on a flexible support, that the apparatus is simple and has a high productivity, and that the functional layer can be produced at a low cost.

SUMMARY OF THE INVENTION

Thus, an object of the present invention is to provide a functional film for transfer, by means of the application method, having a functional layer capable of exhibiting various functions, for example, a transparent conductive layer being low in electric resistance value, to provide an article provided with the functional layer, and to provide a method for producing the article provided with the functional layer. In particular, an object of the present invention is to provide a transfer functional film for providing a functional layer with a uniform thickness to an article having poor flexibility such as a plate material, and to provide an article having poor flexibility provided with the functional layer with a uniform thickness.

An object of the present invention is to provide a functional film for transfer, by means of the application method, capable of providing a functional layer that can exhibit various functions, for example, a transparent conductive layer being low in electric resistance value, to an object article, and applying non-glare treatment to the object article, to provide an article provided with the functional layer and subjected to the non-glare treatment, and to provide a method for producing the same. In particular, an object of the present invention is to provide a transfer functional film for providing a functional layer with a uniform thickness to an article having poor flexibility such as a plate material and applying non-glare treatment to the article, and to provide an article having poor flexibility provided with the functional layer with a uniform thickness and subjected to the non-glare treatment.

Further, an object of the present invention is to provide an adhesive composition for transferring and gluing a functional layer, formed on a flexible support in a releasable state, onto an object article.

Furthermore, an object of the present invention is to provide a functional film for transfer having a functional layer comprising a compressed layer of functional fine particles and an adhesive layer composed of the adhesive composition on a support.

Conventionally, in the application method, it was considered that a functional layer cannot be formed without the use of a large amount of a binder resin, or in the case where the binder resin is not used, the functional layer cannot be obtained unless a functional substance is sintered at a high temperature.

With respect to a conductive layer, it was considered that the conductive layer cannot be formed without the use of a large amount of a binder resin, or in the case where the binder resin is not used, the conductive layer cannot be obtained unless a conductive substance is sintered at a high temperature.

Nevertheless, surprisingly as a result of eager studies made by the present inventor, it has been found out that a functional layer having mechanical strength and being capable of exhibiting various functions can be obtained by compression even without the use of a large amount of the binder resin and without calcining at a high temperature. The present inventor has found out that a transparent conductive layer having a low resistance value can be obtained with the use of a conductive material.

Further, the present inventor has found out that a functional film for transfer can be obtained by forming a functional layer on a support in a state in which the functional layer is releasable from the support, thereby arriving at the present invention.

Further, the present inventor has found out that a functional film for transfer can be obtained by forming a functional layer on a support subjected to non-glare treatment in a state in which the functional layer is releasable from the support, thereby arriving at the present invention.

The present invention is a functional film at least having a functional layer on a support, said functional layer being releasable from the support, wherein the functional layer is a compressed layer of functional fine particles. The support has flexibility.

In the present invention, as being releasable, cases shown in FIG. 1 are included.

FIG. 1(a) describes a mode of release, used in normal meaning, in which a layer A and a layer B, which contact each other, are completely released from the interface.

FIG. 1(b) and FIG. 1(c) describe modes of release in which parts of one layer A remain on another layer B although the layer A and the layer B, which contact each other, are released from the interface. Thus, in microscopic view, if each layer, after it is released, takes substantially the form of a layer, it is defined as being releasable even if it cannot be expressed as the perfect release as shown in FIG. 1(a). The present invention also includes cases in which a compressed layer of functional fine particles corresponds to the layers A of FIG. 1(b) and FIG. 1(c).

Further, in the present invention, "the functional layer being releasable from the support" means a layer in a state in which the support and the functional layer are releasable from each other. In the case that the functional film for transfer of the present invention is practically used, the support is often released from the functional layer stuck onto the object article.

The functional film for transfer of the present invention includes two types, depending on whether a surface of the functional layer is exposed or not at the time of transferring the functional layer to a transfer-object article.

First, the first type in which the surface of the functional layer is not exposed will be described below:

The present invention is the functional film, wherein a releasable layer to be released from the support is formed on the support, and the compressed layer of the functional fine particles is formed on the releasable layer, whereby the releasable layer is releasable together with the compressed layer of the functional fine particles from the support. In the case that the functional layer is transferred to a transfer-object article using the first type functional film, the functional layer is transferred to a surface of the transfer-object article so that the releasable layer exists on the functional layer.

The present invention is the functional film, wherein the releasable layer comprises a resin layer containing a resin as a main component. The resin layer is releasable together with the compressed layer of the functional fine particles from the support.

The present invention is the functional film, wherein the releasable layer comprises a hard-coating layer formed on the support and the resin layer formed on the hard-coating layer. The hard-coating layer is releasable together with the resin layer and the compressed layer of the functional fine particles from the support.

Next, the second type in which the surface of the functional layer is exposed will be described below:

The present invention is the functional film, wherein a base layer is formed on the support, and the compressed layer of the functional fine particles is formed on the base layer, whereby the compressed layer of the functional fine particles is releasable from the base layer.

The base layer is a layer not to be substantially released from the support at the time of transfer. In other words, the present invention is the functional film, wherein a layer not to be released from the support is formed on the support, and the compressed layer of the functional fine particles is formed on the layer not to be released, whereby the compressed layer of the functional fine particles is releasable from the support and the layer not to be released.

In the case that the functional layer is transferred to a transfer-object article using the second type functional film, the functional layer is transferred to a surface of the object article so that a surface of the functional layer is exposed.

The present invention is the functional film, wherein the base layer, namely, the layer not to be released, is a resin layer containing a resin as a main component.

The functional film for transfer of the present invention includes the third type capable of providing the functional layer to the object article and applying non-glare treatment to the object article at the time of transferring the functional layer to the transfer-object article.

The present invention is a transfer functional film at least having a functional layer on a support, said functional layer being releasable from the support, wherein a surface of the support at the side of the functional layer is subjected to non-glare treatment, and the functional layer is a compressed layer of functional fine particles. The support has flexibility.

The present invention is the functional film for transfer, wherein a releasable layer to be released from the support is formed on the support, and the compressed layer of the functional fine particles is formed on the releasable layer, whereby the releasable layer is releasable together with the compressed layer of the functional fine particles from the support.

The present invention is the functional film for transfer, wherein the releasable layer comprises a resin layer containing a resin as a main component. The resin layer is releasable together with the compressed layer of the functional fine particles from the support.

The present invention is the functional film for transfer, where the releasable layer comprises a hard-coating layer formed on the support and the resin layer formed on the hard-coating layer. The hard-coating layer is releasable together with the resin layer and the compressed layer of the functional fine particles from the support.

In the functional films of the first type, the second type and the third type, it is also preferable that an adhesive layer is formed on the compressed layer of the functional fine particles. In the case that the adhesive layer is not formed in the functional film, an adhesive layer may be formed on a transfer-object article in advance.

In the functional film, the compressed layer of the functional fine particles is obtained by applying a liquid in which the functional fine particles are dispersed onto the support or the resin layer (the releasable layer in the first type; the base layer, namely the layer not to be released in the second type; the releasable layer in the third type) followed by drying to form a layer containing the functional fine particles, and compressing the layer containing the functional fine particles.

In the functional film, it is preferable that the compressed layer of the functional fine particles is obtained by compressing at a compression force of at least 44 N/mm$^2$.

At the time of producing the functional film, although the dispersion liquid of the functional fine particles may contain a small amount of a resin, it is particularly preferable that the dispersion liquid does not contain the resin. In the case that the dispersion liquid of the functional fine particles contain the resin, a content of the resin is preferably lower than 25 parts by volume with respect to 100 parts by volume of the functional fine particles.

In the functional film, in the case that conductive fine particles are used as the functional fine particles, a functional film having a conductive layer (that is, a conductive film for transfer) is obtained. In the functional film, it is also preferable that the compressed layer of the functional fine particles is a transparent conducive layer.

The present invention is an article provided with the functional layer of the functional film. In the case that the second type functional film is used, an object on which a surface of the functional layer is exposed is directly obtained. In the present invention, the functional layer may be subjected to patterning.

Further, the present invention is a method for producing an article provided with a functional layer, characterized by transferring the functional layer of the functional film from the support to the object article through an adhesive layer of the functional film and/or an adhesive layer formed on the object article to be provided with the functional layer.

The present invention is an article provided with a releasable layer comprising the functional layer of the functional film for transfer and subjected to non-glare treatment.

Furthermore, the preset invention is a method for producing an article provided with a functional layer and subjected to non-glare treatment, characterized by transferring a releasable layer comprising the functional layer of the transfer functional film from the support to an object article to be provided with the functional layer so that a surface released from the support faces outside. At the time of transfer, the adhesive layer of the functional film and/or the adhesive layer formed on the object article may be used.

According to the present invention, a functional film for transfer having a functional layer being excellent in performance is obtained by simple and convenient operations of applying and compressing. According to the present invention, an article provided with the functional layer and a method for producing the article provided with the functional layer are provided. In particular, the present invention has advantages in the case that the functional layer with a uniform thickness is provided to an article having poor flexibility such as a plate material.

According to the present invention, a transfer functional film capable of providing a functional layer having excellent performance to an object article and applying non-glare treatment to the object article is obtained by simple and convenient operations of applying and compressing. According to the present invention, an article provided with the functional layer and subjected to the non-glare treatment, and a method for producing the same are provided. In particular, the present invention has advantages in the case that the functional layer with a uniform thickness is provided to an article having poor flexibility such as a plate material and that non-glare treatment is applied to the article.

According to the present invention, an adhesive composition suitable as an adhesive for the functional film is provided. Further, a functional film having the adhesive layer composed of the adhesive composition is provided.

DETAILED DESCRIPTION OF THE INVENTION

The present invention will be described with reference to the drawings. Examples of layer constitution of the first type functional film and the second type functional film in the present invention are shown in FIG. 2 to FIG. 6.

Figure 1:
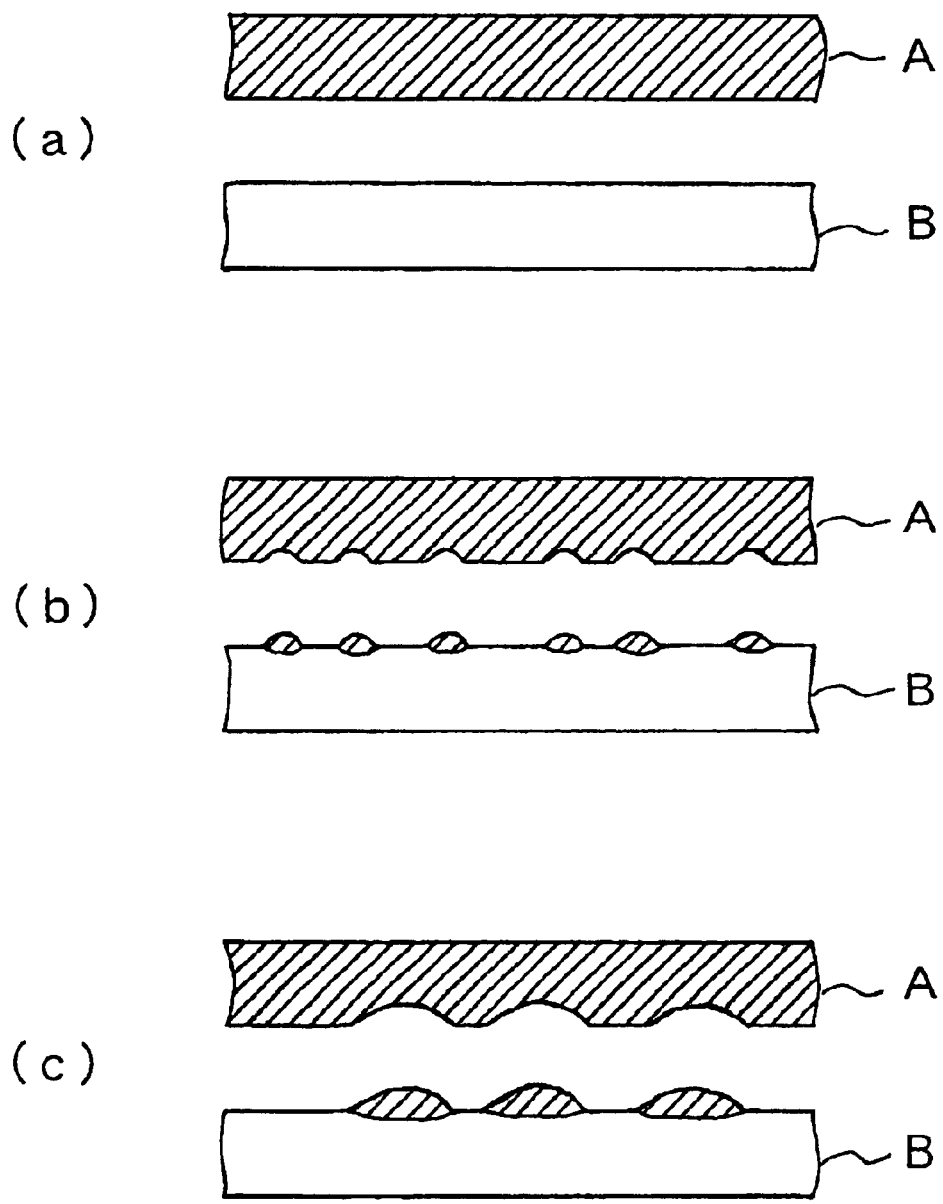
FIG. 1 is a view for describing modes of release.
Figure 2:
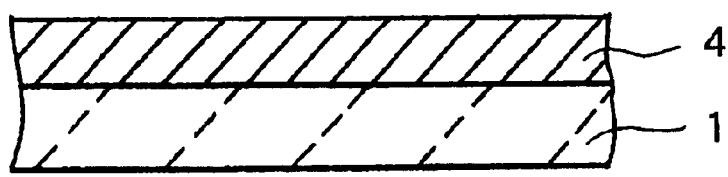
FIG. 2 is a cross-sectional view illustrating one example of the functional film in the present invention.

FIG. 2 is a cross-sectional view illustrating an example of layer constitution of a functional film in which a functional layer (4) is formed on a support (1). In this case, a surface of the support (1) at the side of the functional layer (4) is subjected to release treatment.

Figure 3:
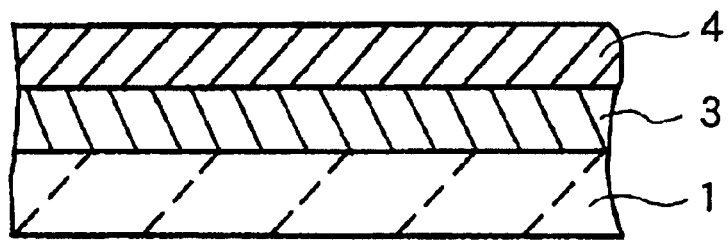
FIG. 3 is a cross-sectional view illustrating one example of the functional film in the present invention.

FIG. 3 is a cross-sectional view illustrating an example of layer constitution of a functional film in which a resin layer (3) and a functional layer (4) are formed in this order on a support (1). The resin layer (3) is a releasable layer in the first type and a base layer, namely a layer not to be released in the second type. In the case of the first type, a surface of the support (1) at the side of the resin layer (3) is subjected to the release treatment, so that the release occurs between the support (1) and the resin layer (3) at the time of transfer. In the case of the second type, close adhesive properties between the support (1) and the resin layer (3) are high so that the release occurs between the resin layer (3) and the functional layer (4).

Figure 4:
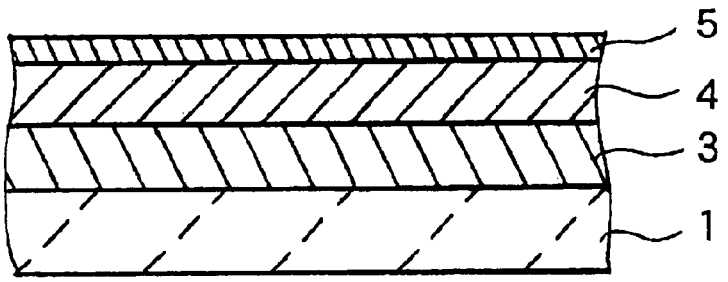
FIG. 4 is a cross-sectional view illustrating one example of the functional film in the present invention.

FIG. 4 is a cross-sectional view illustrating an example of layer constitution of a functional film in which a resin layer (3), a functional layer (4) and an adhesive layer (5) are formed in this order on a support (1). Namely, the adhesive layer (5) is further formed on the functional layer (4) in FIG. 3. In the case of the first type, the release occurs between the support (1) and the resin layer (3) at the time of transfer. In the case of the second type, the release occurs between the resin layer (3) and the functional layer (4) at the time of transfer.

Figure 5:
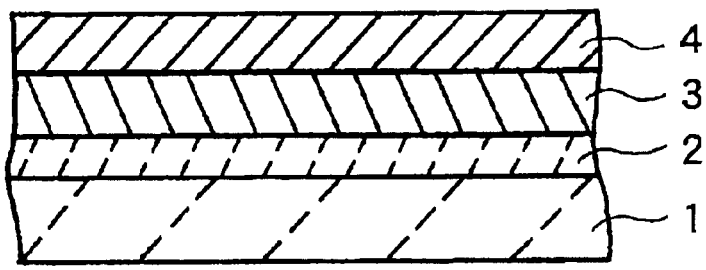
FIG. 5 is a cross-sectional view illustrating one example of the functional film in the present invention.

FIG. 5 is a cross-sectional view illustrating an example of layer constitution of the first type functional film in which a hard-coating layer (2), a resin layer (3) and a functional layer (4) are formed in this order on a support (1). In this case, a surface of the support (1) at the side of the hard-coating layer (2) may be subjected to the release treatment, and may be subjected to none of the release treatment. The release occurs between the support (1) and the hard-coating layer (2) at the time of transfer.

Figure 6:
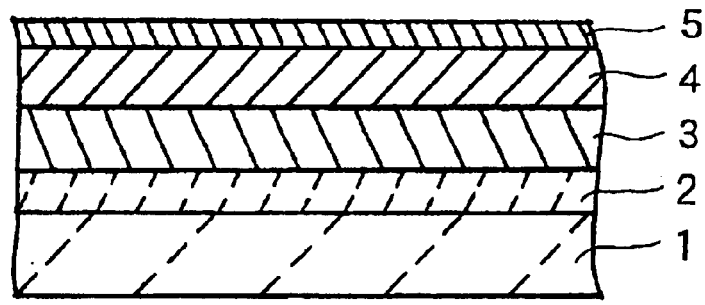
FIG. 6 is a cross-sectional view illustrating one example of the functional film in the present invention.

FIG. 6 is a cross-sectional view illustrating an example of layer constitution of the first type functional film in which a hard-coating layer (2), a resin layer (3), a functional layer (4) and an adhesive layer (5) are formed in this order on a support (1). Namely, the adhesive layer (5) is further formed on the functional layer (4) in FIG. 5. In this case, a surface of the support (1) at the side of the hard-coating layer (2) may be subjected to the release treatment, and may be subjected to none of the release treatment. The release occurs between the support (1) and the hard-coating layer (2) at the time of transfer.

Figure 7:
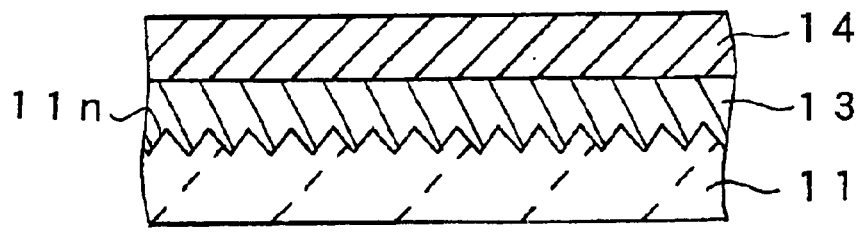
FIG. 7 is a cross-sectional view illustrating one example of the third type functional film in the present invention.
Figure 8:
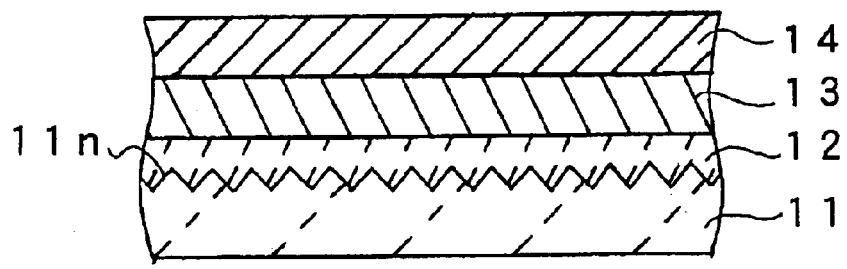
FIG. 8 is a cross-sectional view illustrating one example of the third type functional film in the present invention.
Figure 9:
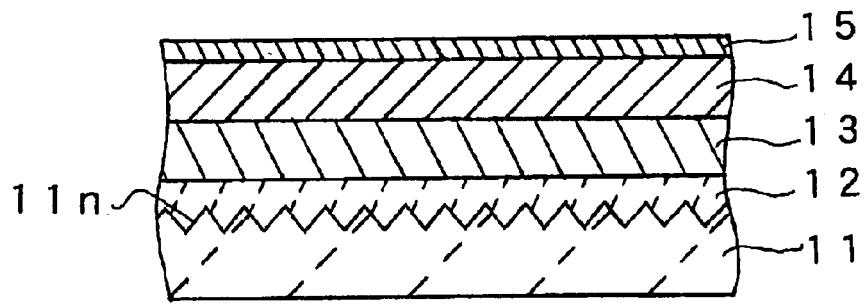
FIG. 9 is a cross-sectional view illustrating one example of the third type functional film in the present invention.

Examples of layer constitution of the third type functional film in the present invention are shown in FIG. 7 to FIG. 9.

FIG. 7 is a cross-sectional view illustrating an example of layer constitution of a functional film for transfer in which a resin layer (13) and a functional layer (14) are formed in this order on a non-glare treated surface (11n) of a support (11). In this case, the non-glare treated surface (11n) of the support (11) is subjected to the release treatment.

FIG. 8 is a cross-sectional view illustrating an example of layer constitution of a functional film for transfer in which a hard-coating layer (12), a resin layer (13) and a functional layer (14) are formed in this order on a non-glare treated surface (11n) of a support (11). In this case, the non-glare treated surface (11n) of the support (11) maybe subjected to the release treatment, and may be subjected to none of the release treatment.

FIG. 9 is a cross-sectional view illustrating an example of layer constitution of a functional film for transfer in which a hard-coating layer (12), a resin layer (13), a functional layer (14) and an adhesive layer (15) are formed in this order on a non-glare treated surface (1n) of a support (11). In this case, the non-glare treated surface (11n) of the support (11) may be subjected to the release treatment, and may be subjected to none of the release treatment.

In the present invention, the functional layers (4) and (14) are not particularly limited, and include layers having various functions such as a conductive layer, an ultraviolet shielding layer, an infrared shielding layer, a magnetic layer, a ferromagnetic layer, a dielectric layer, a ferroelectric layer, an electrochromic layer, an electroluminescent layer, an insulating layer, a light-absorbing layer, a light selecting absorbing layer, a reflecting layer, a reflection preventing layer, a catalyst layer, a photocatalyst layer and the like. Therefore, in the present invention, functional fine particles are used to constitute the aforesaid intended layers. The functional fine particles to be used are not particularly limited and may be mainly inorganic fine particles having an agglomeration force. In the production of any of the functional films, by applying a method of the present invention, a functional coating layer having a sufficient mechanical strength can be obtained, and the disadvantage, caused by a binder resin in the conventional application method that makes use of a large amount of the binder resin, can be eliminated. As a result, the intended function is further improved.

For example, in the production of a transparent conductive layer, conductive inorganic fine particles are used such as tin oxide, indium oxide, zinc oxide, cadmium oxide, antimony-doped tin oxide (ATO), fluorine-doped tin oxide (FTO), tin-doped indium oxide (ITO), aluminum-doped zinc oxide (AZO), or the like. In view of obtaining a more excellent conductivity, ITO is preferable. Alternatively, those in which the surface of fine particles such as barium sulfate having transparency is coated with an inorganic material such as ATO, ITO, or the like may be used. The particle diameter of these fine particles differs depending on the degree of scattering required in accordance with the usage of the conductive film, and may generally vary depending on the shape of the particles; however, it is generally 10 $\mu$m or less, preferably 1.0 $\mu$m or less, more preferably from 5 nm to 100 nm.

Alternatively, organic conductive fine particles may be used. As the organic conductive fine particles, for example, those in which the surface of the resin fine particles is coated with a metal material, and others may be mentioned.

By application of the production method in the present invention, an excellent conductivity is obtained. In the present invention, transparency means transmittance of visible light. With respect to the degree of scattering of light, desired level differs depending on the usage of the conductive layer. In the present invention, those generally referred to as being translucent and having a scattering are also included.

In the production of the ferromagnetic layer, iron oxide type magnetic powders such as $\gamma$-$Fe_2O_3$, $Fe_3O_4$, Co—$FeO_x$, Ba ferrite, etc., ferromagnetic alloy powders containing a ferromagnetic metal element such as $\alpha$-Fe, Fe—Co, Fe—Ni, Fe—Co—Ni, Co, Co—Ni, etc. as a major component, or the like is used. By application of the production method in the present invention, the saturation magnetic flux density of the magnetic coating layer is improved.

In the production of the dielectric layer or the ferroelectric layer, dielectric or ferroelectric fine particles such as magnesium titanate type, barium titanate type, strontium titanate type, lead titanate type, lead titanate zirconate type (PZT), lead zirconate type, lanthanum-doped lead titanate zirconate type (PLZT), magnesium silicate type, a lead-containing perovskite compound, or the like are used. By application of the production method in the present invention, dielectric properties or ferroelectric properties are improved.

In the production of a metal oxide layer that exhibits various functions, fine particles of metal oxide such as iron oxide ($Fe_2O_3$), silicon oxide ($SiO_2$), aluminum oxide ($Al_2O_3$), titanium dioxide ($TiO_2$), titanium oxide (TiO), zinc oxide (ZnO), zirconium oxide (ZrO$_2$), tungsten oxide (WO$_3$), or the like are used. By application of the production method in the present invention, the packing density of metal oxide in the layer increases to improve various functions. For example, if SiO$_2$ or Al$_2$O$_3$ carrying a catalyst is used, a porous catalyst layer having a practicable strength is obtained. If TiO$_2$ is used, a photocatalyst function is improved. Further, if WO$_3$ is used, an improvement of chromophoric action in an electrochromic display element is obtained.

Further, in the production of the electroluminescent layer, fine particles of zinc sulfide (ZnS) are used. By application of the production method in the present invention, an inexpensive electroluminescent layer can be produced by the application method.

In the present invention, a liquid in which functional fine particles selected from the above-mentioned various functional fine particles are dispersed therein is used as a functional paint in accordance with the objects. The functional paint is applied onto a support or onto a resin layer containing a resin as a major component formed on the support and dried to form a layer containing the functional fine particles. Thereafter, the layer containing the functional fine particles is compressed to form a compressed layer of the functional fine particles, thereby to obtain the functional layer.

The liquid for dispersing the functional fine particles such as conductive fine particles or the like is not particularly limited, and various known liquids may be used. For example, as the liquid, saturated hydrocarbons such as hexane, aromatic hydrocarbons such as toluene and xylene, alcohols such as methanol, ethanol, propanol and butanol, ketones such as acetone, methyl ethyl ketone, methyl isobutyl ketone and diisobutyl ketone, esters such as ethyl acetate and butyl acetate, ethers such as tetrahydrofuran, dioxane and diethyl ether, amides such as N,N-dimethylformamide, N-methylpyrrolidone (NMP) and N,N-dimethylacetamide, halogenated hydrocarbons such as ethylene chloride and chlorobenzene, and others may be mentioned. Among these, liquids having a polarity are preferable, and in particular, alcohols such as methanol and ethanol, and amides such as NMP having an affinity with water are suitable because the dispersion is good without the use of a dispersant. These liquids can be used either alone or as a mixture of two or more kinds thereof. Further, a dispersant may be used depending on a kind of the liquid.

Also, water can be used as the liquid. If water is used as the liquid, the resin layer surface must be hydrophilic. The resin film and the resin layer are usually hydrophobic and are water-repellent, so that a uniform layer is not likely to be obtained. In the case described above, it is necessary to mix an alcohol with water or to make a hydrophilic surface of the support.

The amount of the liquid to be used is not particularly limited, and may be such that the dispersion liquid of the fine particles has a viscosity suitable for application. For example, 100 to 100,000 parts by weight of the liquid is used with respect to 100 parts by weight of the fine particles. The amount of the liquid may be suitably selected in accordance with kinds of the fine particles and the liquid.

The dispersion of the fine particles into the liquid may be carried out by a known dispersion technique. For example, the dispersion is carried out by the sand grinder mill method. At the time of dispersion, use of a medium such as zirconia beads is also preferable in order to loosen the agglomeration of the fine particles. Further, at the time of dispersion, one must take care not to mix impurities such as dust.

It is preferable that the dispersion liquid of the fine particles does not contain a resin. In other words, the amount of the resin is preferably zero. In the conductive layer, if the resin is not used, the contact between the conductive fine particles is not inhibited by the resin. Therefore, the conductivity among the conductive fine particles is ensured, and the electric resistance value of the obtained conductive layer is low. The resin may be contained in an amount that does not deteriorate the conductivity; however, the amount is extremely small as compared with the amount of the resin used as a binder resin in the prior art. For example, the upper limit of the resin contained in the dispersion liquid is less than 25 parts by volume with respect to 100 parts by volume of the conductive fine particles as represented by volume before dispersion. In the prior art, one has to use a large amount of the binder in order to obtain a mechanical strength of the coating layer, since strong compression is not carried out. If the resin is used in such an amount as to function as the binder, the contact between the conductive fine particles is inhibited by the binder, and the migration of electrons among the fine particles is inhibited to reduce the conductivity.

On the other hand, the resin has an effect to improve a haze of the conductive layer. However, in view of the conductivity, the resin is used preferably in a range of less than 25 parts by volume, more preferably in a range of less than 20 parts by volume, with respect to 100 parts by volume of the conductive fine particles as represented by volume before dispersion. Although the effect to improve the haze decreases, it is the most preferable not to use the resin in view of the conductivity.

In the functional layers using WO$_3$ fine particles, TiO$_2$ fine particles or the like, if the resin is not used, the contact between the fine particles is not inhibited by the resin, so that an improvement is achieved in various functions. The resin may be contained in an amount that does not inhibit the contact between the fine particles and does not deteriorate the various functions; however, the amount is, for example, about 80 parts by volume or less with respect to 100 parts by volume of the respective fine particles.

In the catalyst layer using Al$_2$O$_3$ fine particles or the like, if the resin is not used, the surface of the fine particles having a catalyst function is not covered with the resin. Therefore, the function as the catalyst is improved. In the catalyst layer, the larger the number of voids is in the inside of the layer, the larger the number of active points as the catalyst. In view of this point, it is preferable not to use the resin as much as possible.

Thus, for the functional layer it is preferable not to use the resin at the time of compression (namely, in the dispersion liquid of the functional fine particles); and even if the resin is used, it is preferably used in a small amount. The amount of the resin to be used may be suitably determined because the amount may vary to some extent depending on the object of the functional layer.

Various additives may be blended with the dispersion liquid of the fine particles within a range that satisfies the performance required in the function such as the conductivity or the catalyst action. For example, the additives such as an ultraviolet absorber, a surfactant, and a dispersant may be blended.

The supports (1) and (11) are suitably flexible resin films that are not cracked even if the compression force of the compression step is increased. The resin film is lightweight and can be easily handled. In the present invention, since a pressing step at a high temperature or a calcining step is not carried out, the resin film may be used as the support.

As the resin film, for example, polyester film such as polyethylene terephthalate (PET), polyolefin film such as polyethylene and polypropylene, polycarbonate film, acrylic film, norbornene film (Arton manufactured by JSR Co., Ltd., or the like), and others may be mentioned.

Besides the resin film, cloth, paper or others may be used as the support.

In the third type functional film, it is required that a surface of the support (11) at the side where the functional layer should be formed has unevenness; that is, it is required that the surface is subjected to non-glare treatment. Since the surface of the support has unevenness, a surface of the releasable layer, formed on the support, at the contact side with the support has unevenness in accordance with the unevenness of the support surface. Therefore, when the releasable layer comprising the functional layer is transferred from the support to the object article so that a surface released from the support faces outside, the object article having a surface subjected to the non-glare treatment is obtained.

In the case of the functional film having the layer constitution of FIG. 2, a surface of the support (1) at the side where the functional layer (4) should be formed may be subjected to the release treatment, so that the formed functional layer (4) is in a state in which the functional layer (4) is releasable from the support (1). For example, a silicone releasing agent or the like may be applied onto the support surface.

In the first type and the third type functional films, surface treatment of the supports (1) and (11), the hard-coating layers (2) and (12), and the resin layers (3) and (13) will be described.

In the case of the first type functional films having the layer constitution of FIG. 3 and FIG. 4, a surface of the support (1) at the side of the resin layer (3) may be subjected to the release treatment in accordance with affinity of resin materials being composed of the resin layer (3) with the support (1), so that the release occurs between the support (1) and the resin layer (3) at the time of transfer.

Further, as shown in FIG. 5 and FIG. 6, the hard-coating layer being low in close adhesive properties with the support may be formed on the surface of the support (1). The hard-coating layer formed by using a silicone resin (for example, with the pencil hardness of larger than 4H, preferably 5H or harder) has low close adhesive properties with the resin film such as PET, so that the support (1) can be easily released from the hard-coating layer (2). In this case, although the surface of the support (1) may be treated with a releasing agent, treatment with the releasing agent is not necessary.

In the case of the third type functional films having the layer constitution of FIG. 8 and FIG. 9, a surface of the support (11) at the side where the functional layer (14) should be formed may be subjected to release treatment in accordance with affinity of materials being composed of the hard-coating layer (12) with the support (11), so that the formed functional layer (14) is in a state in which the functional layer is releasable from the support (11). For example, the silicone releasing agent or the like may be applied onto the support surface. The films treated with the releasing agent are generally referred to as release films. Further, for example, a hard-coating layer having low close adhesive properties with the support is also preferably formed on the support surface. The hard-coating layer formed by using the silicone resin (for example, with the pencil hardness of 4H or harder) has low close adhesive properties with the resin film such as PET, and can be easily released. In this case, treatment of the support surface with the releasing agent is not necessary.

The hard-coating layers (2) and (12) can be formed by applying a liquid in which a hard-coating material is dissolved into a solvent in accordance with the needs onto the support, drying the applied liquid and curing it.

The hard-coating material is not particularly limited, and various known hard-coating materials may be used. For example, a thermosetting hard-coating material such as silicone type, acrylic type and melamine type may be used. Among these, the silicone type hard-coating material is excellent in view of obtaining high hardness.

Further, an ultraviolet-curable type hard-coating material including a radical-polymerizing hard-coating material such as unsaturated polyester resin type and acrylic type, a cation-polymerizing hard-coating material such as epoxy type and vinyl ether type, and others may be used. In view of productivity such as curing reactivity, the ultraviolet-curable type hard-coating material is preferable. Among these, in views of curing reactivity and surface hardness, the acrylic type radical-polymerizing hard-coating material is desirable.

Application of the hard-coating material may be performed by a known method such as a roll coater including gravure cylinder, reverse, and Meyer bar, a slit die coater, or others.

After the application, the applied one is dried at a suitable range of temperature, and then cured. In the case of the thermosetting hard-coating material, by providing suitable heat, for example, the silicone type hard-coating material applied is cured by heating at about 60° C. to 120° for 1 minute to 48 hours. In the case of the ultraviolet-curable type hard-coating material, ultraviolet rays are irradiated for curing. The ultraviolet rays may be irradiated by irradiating ultraviolet rays for about 200 to 2000 $mJ/cm^2$ with the use of a lamp such as a xenon lamp, a low pressure mercury-vapor lamp, a middle pressure mercury-vapor lamp, a high pressure mercury-vapor lamp, a super high pressure mercury-vapor lamp, a metal halide lamp, a carbon arc lamp, or a tungsten lamp. A thickness of the hard-coating layer is, for example, about 0.5 to 20 $\mu$m, preferably about 2 to 5 $\mu$m.

An ultraviolet absorber may be contained in the hard-coating layers (2) and (12). As the ultraviolet absorber, various known ultraviolet absorbers may be used. For example, a salicylic acid type ultraviolet absorber, a benzophenone type ultraviolet absorber, a benzotriazole type ultraviolet absorber, a cyanoacrylate type ultraviolet absorber, and the like, may be mentioned. Further, various known additives such as a light stabilizer including a hindered-amine type light stabilizer and others, an antioxidant, an antistatic agent, a fire retardant, or the like, may be also contained in the hard-coating layer, in accordance with the needs. The ultraviolet absorber or various additives may be added into the hard-coating material, and may be applied.

In the case that the hard-coating layers (2) and (12) are formed on the supports (1) and (11), respectively, the functional fine particles such as the conductive fine particles are not embedded in the hard-coating layers (2) and (12) at the time of compressing processes after drying, thereby failing to provide good close adhesive properties between the fine particles layers (4) and (14) and the hard-coating layers (2) and (12), respectively.

Thus, in the first type and the third type in the present invention, it is preferable that the resin layers (3) and (13)

comprising a soft resin as a main component are formed on the hard-coating layers (2) and (12), respectively, in advance, and that the liquid in which the functional fine particles are dispersed are applied onto the resin layers (3) and (13), dried and compressed. For the resin layers (3) and (13), softness of the degree by which the compressed layers (4) and (14) of the functional fine particles are formed with good close adhesive properties is required. Consequently, the resin layers are preferably softer than, for example, pencil hardness of 2H. The degree of the softness required for the resin layers varies depending on a hardness of the hard-coating layer used, a kind or a particle diameter of the functional fine particles, compression force or the like.

For the resin layers (3) and (13) in the first type and the third type, soft resins may be used, and as the soft resins, for example, resins capable of obtaining relatively low hardness, are used from acrylic resins, urethane resins, vinyl chloride resins, silicone resins or the like. The resin layers may contain fine particles such as silica for controlling hardness of the resin layers, or filler for coloring or absorbing ultraviolet rays, in a range that does not give bad influences to close adhesive properties. After compression, the soft resin layers maybe cured by heat or ultraviolet rays.

Next, the resin layer (3) in the second type functional film will be described.

In the case of the second type functional films having the layer constitution of FIG. 3 and FIG. 4, it is preferable that the resin layer (3) has relatively high hardness, for example, pencil hardness of 2H or harder and 4H or softer, so that the release occurs between the resin layer (3) and the functional layer (4) at the time of transfer. It is also preferable that close adhesive properties between the support (1) and the resin layer (3) are high.

For the resin layer (3) in the second type, relatively hard resins may be used, and as such resins, resins capable of obtaining relatively high hardness are used from acrylic resins, urethane resins, vinyl chloride resins, silicone resins or the like. The resin layer may contain fine particles such as silica for controlling hardness of the resin layer. After compression, the resin layer may be cured by heat, ultraviolet rays, or the like.

The resin of the resin layers (3) and (13) in the functional film of the first type, the second type and the third type is preferably insoluble into the liquid in which the functional fine particles are dispersed. In the conductive layer, if the resin layer is dissolved, the solution containing the resin comes around the conductive fine particles by capillary phenomenon and, as a result, raises the electric resistance value of the obtained conductive layer. In the catalyst layer also, the solution containing the resin comes around the fine particles having a catalyst function by capillary phenomenon to cause decrease in the catalyst function.

The dispersion liquid of the functional fine particles is applied onto the resin layers (3) and (13) or onto the supports (1) and (11), and dried to form layers containing the functional fine particles such as layers containing the conductive fine particles.

Application of the dispersion liquid of the fine particles is not particularly limited, and may be carried out by a known method. For example, the application may be carried out by the application method such as the reverse roll method, the direct roll method, the blade method, the knife method, the extrusion nozzle method, the curtain method, the gravure roll method, the bar coat method, the dip method, the kiss coat method, the squeeze method, or the like. Further, the dispersion liquid may be allowed to adhere onto the support by atomizing, spraying, or the like.

The drying temperature is preferably about 10 to 150° C. although it depends on a kind of the liquid used for dispersion. If the temperature is lower than 10° C., condensation of moisture in air is liable to occur, whereas if it exceeds 150° C., the resin film support will be deformed. Also, at the time of drying, one must take care not to allow impurities to adhere to the surface of the fine particles.

The thickness of the layer containing the functional fine particles such as the layer containing the conductive fine particles after application and drying may be about 0.1 to 10 μm, though it depends on the compression condition in the next step or on the usage of the each functional film such as the conductive film finally obtained.

Thus, if the functional fine particles such as the conductive fine particles are dispersed in the liquid for application and drying, it is easy to form a uniform layer. If the dispersion liquid of the fine particles is applied and dried, the fine particles form a layer even if a binder is not present in the dispersion liquid. The reason why the layer is formed even in the absence of the binder is not necessarily clear; however, when the amount of the liquid decreases by drying, the fine particles gather by a capillary force. Further, it seems that, since they are the fine particles, the specific surface area is large and the agglomeration force is strong to form a layer. However, the strength of the layer at this stage is weak. Also, in the conductive layer, it has a high resistance value and has a large variation of the resistance value.

Next, the formed layer containing the functional fine particles such as the layer containing the conductive fine particles is compressed to obtain a compressed layer (4) of the functional fine particles such as the conductive fine particles. The compression improves the strength of the layer. Namely, the compression increases the number of contact points among the functional fine particles such as the conductive fine particles to increase the contact area. For this reason, the strength of the coating layer is increased. Since the fine particles are originally liable to be agglomerated, the compression makes a firm layer.

In the conductive layer, the strength of the coating layer increases and the electric resistance decreases. In the catalyst layer, the strength of the coating layer increases and the layer will be a porous layer, since the resin is not used or used in a small amount. Therefore, a higher catalyst function is obtained. In the other functional layers, the layer can be made into a layer having a high strength in which the fine particles are connected with each other, and also the filling amount of the fine particles per unit volume will be large, since the resin is not used or used in a small amount. For this reason, a higher function is obtained in each layer.

The compression is preferably carried out at a compression force of at least 44 N/mm$^2$. If it is carried out at a low pressure of less than 44 N/mm$^2$, the layer containing the functional fine particles such as the layer containing the conductive fine particles cannot be fully compressed and, for example, it is difficult to obtain a conductive layer being excellent in conductivity. A compression force of at least 135 N/mm$^2$ is more preferable, and a compression force of at least 180 N/mm$^2$ is still more preferable. According as the compression force is higher, the strength of the coating layer is improved, and the close adhesive properties between the functional layer and the support will be improved. In the conductive layer, a layer being more excellent in conductivity is obtained, the strength of the conductive layer is improved, and the close adhesive properties between the conductive layer and the resin layer will be firm. According as the compression force is raised, the pressure resistance of the apparatus must be raised, so that a compression force up to 1000 N/mm² is generally suitable.

Further, the compression is preferably carried out at such a temperature that the support is not deformed. If the support is the resin film, for example, it will be a temperature range below the glass transition temperature (secondary transition temperature) of the resin.

The compression is not particularly limited and may be carried out by sheet press or roll press; however, it is preferably carried out by means of a roll press machine. The roll press is a method in which the film to be compressed is sandwiched between rolls for compression and the rolls are rotated. The roll press is suitable because a high uniform pressure can be applied in the roll press, and the productivity of the roll press is higher than that of the sheet press.

The roll temperature of the roll press machine is preferably an ordinary temperature (an environment suitable for human work) from the viewpoint of productivity. If the compression is carried out in a heated atmosphere or with heated rolls (hot press), there will be a disadvantage such that the resin film is elongated when the compression pressure is increased. If the compression pressure is reduced in order to prevent the resin film from being elongated under heating, the mechanical strength of the coating layer decreases. In the conductive layer, the mechanical strength of the coating layer decreases and the electric resistance rises. It is also preferable to control the temperature so that the roll temperature may not rise by heat generation in the case where continuous compression is carried out by means of the roll press machine.

If there is a reason to reduce the adhesion of moisture to the fine particle surface as much as possible, the heated atmosphere may be adopted in order to reduce the relative humidity of the atmosphere; however, the temperature range is within a range such that the film is not easily elongated. Generally, it will be a temperature range below the glass transition temperature (secondary transition temperature). By taking the variation of humidity into account, it may be set at a temperature which is a little higher than the temperature that achieves the required humidity.

Here, the glass transition temperature of the resin film is determined by measuring the dynamic viscoelasticity, and refers to the temperature at which the dynamic loss of the main dispersion is at its peak. For example, with regard to PET film, its glass transition temperature is approximately around 110° C.

The roll of the roll press machine is preferably a metal roll because a strong pressure can be applied. Also, if the roll surface is soft, the fine particles maybe transferred to the rolls at the compressing time, so that the roll surface is preferably treated with a hard film such as hard chromium, spraying film of ceramics, a film obtained by ionic plating of TiN, etc., DLC (diamond like carbon), or the like.

In this manner, the compressed layers (4) and (14) of the functional fine particles such as the conductive fine particles are formed. The thickness of the compressed layer of the functional fine particles such as the conductive fine particles may be about 0.1 to 10 μm, though it depends on the usage. Further, in order to obtain a thick compressed layer having a thickness of about 10 μm, a series of operations comprising application of the dispersion liquid of the fine particles, drying, and compression may be carried out repeatedly. Furthermore, in the present invention, it is of course possible to form the functional layers such as the conductive layer on both surfaces of the support. The functional layer such as the transparent conductive layer thus obtained shows a functionality such as an excellent conductivity or catalyst action, has a practically sufficient strength of the layer even though it is made without the use of the binder resin or with the use of a small amount of the resin such that it does not function as the binder. In the first type and the third type, the functional layer also has excellent close adhesive properties with the soft resin layers (3) and (13).

In the functional films of the first type, the second type and the third type in the present invention, the compressed layers (4) and (14) of the functional fine particles may comprise at least two different compressed layers of functional fine particles.

In accordance with objects or usage of a multi-layer functional layer, multi-layer constitution may be accomplished by combining two or more functional layers having different functions. For example, the multi-layer functional layers for solar batteries, electroluminescent elements, electrochromic elements or the like may be obtained by combining two or more functional layers.

For the solar batteries, specifically, a multi-layer constitution comprising a transparent conductive layer, a transparent insulating layer, a semiconductive layer of chalcopalrite structure composed of groups 1, 3 and 4 elements, and a metal electrode in this order, is illustrated.

For distributed D.C. operating electroluminescent elements, multi-layer constitution comprising a transparent conductive layer, an EL emission layer, a rear electrode in this order, is illustrated.

For permeable electrochromic elements, multi layer constitution comprising a transparent conductive layer, a first chromophoric layer, a dielectric layer, a second chromophoric layer and a transparent conductive layer in this order, is illustrated.

Besides these, various multi-layer constitutions in accordance with various usages may be considered.

The multi-layer constitution is obtained by performing repeatedly a series of operations comprising applying a dispersion liquid of corresponding functional fine particles, drying and compressing. Each layer that constitutes the multi-layer constitution is not necessarily a compressed layer. For example, in the case of the solar batteries, the transparent conductive layer, the transparent insulating layer and the semiconductive layer may be formed by compression and the metal electrode may be formed by vacuum deposition.

In the functional film of the first type, the second type and the third type in the present invention, it is also preferable that the adhesive layers (5) and (15) are formed on the functional layers (4) and (14), respectively. By forming the adhesive layers (5) and (15), the functional layers (4) and (14) can be easily transferred to the object article to which the functional layers (4) and (14) are intended to be provided, through the adhesive layers. In the functional film of the present invention, if the adhesive layer is not formed, an adhesive layer may be formed on a transfer-object article in advance. Of course, it is also preferable that the adhesive layers (5) and (15) are formed in the functional film of the present invention and the adhesive layer is further formed on the transfer-object article.

The adhesive layers (5) and (15) of the functional film in the present invention and the adhesive layer formed on the transfer-object article in advance are not particularly limited and various known adhesives may be used, if the adhesive layers have affinity to both the functional layers (4) and (14) of the functional film and a surface of the transfer-object article, and can strongly glue the both. For example, an acrylic type adhesive, an epoxy type adhesive, an isocyanate type adhesive, a silicone type adhesive and the like may be mentioned. The adhesive may be curable one by ultraviolet rays or heat after transferring to the transfer-object article. Hot melt type may be also used.

As the adhesive used for the adhesive layers (5) and (15) of the functional film in the present invention, adhesives capable of providing an adhesive layer having a tacky feeling by just applying an adhesive solution and drying, and providing a very hard cured layer by sticking the adhesive layer onto the transfer-object article followed by curing the adhesive layer by ultraviolet rays, are preferable. Softening or deterioration of the adhesive layer after sticking onto the transfer-object article is not preferable.

Thus, the present inventor also studied regarding adhesives satisfying such properties, and found out that following adhesive compositions are suitable as the adhesive used for the adhesive layer of the functional film in the present invention.

1. An adhesive composition comprising a polymer resin component (P) having a glass transition temperature Tg of 30° C. or higher and a curable low molecular weight component (M) in a weight ratio P/M of 8/2 to 2/8.
2. The adhesive composition according to 1., wherein the polymer resin component (P) is a solid at an ordinary temperature and the curable low molecular weight component (M) is a liquid at an ordinary temperature.
3. The adhesive composition according to 1. or 2., wherein the polymer resin component (P) is an acrylic type resin and the curable low molecular weight component (M) is an acrylic type monomer.
4. The adhesive composition according to any one of 1. to 3., wherein a photopolymerization initiator is further contained.
5. The adhesive composition according to any one of 1. to 4., wherein the adhesive composition is curable by light irradiation.

By that the polymer resin component is a solid at an ordinary temperature and that the curable low molecular weight component is a liquid at an ordinary temperature, a self-adhesive layer having self-adhesive properties and being curable by providing stimulation can be easily formed. The self-adhesive layer may have suitable self-adhesive properties.

As the polymer resin component, for example, an acrylic resin 103B (manufactured by Taisei Chemical Industries, Ltd.) may be mentioned. As the curable low molecular weight component, for example, a tri- or more functional acrylic type monomer such as KAYARAD GPO-303, KAYARAD TMPTA, KAYARAD THE-300 (those were manufactured by Nippon Kayaku Co., Ltd.) may be mentioned. As the photopolymerization initiator, various one may be used and, for example, KAYACURE DETX-S (manufactured by Nippon Kayaku Co., Ltd.) may be mentioned.

By that the adhesive composition is cured by light irradiation, productivity is improved at the time of gluing the functional film onto the object article.

The adhesive composition may contain additives such as an ultraviolet absorber, an infrared absorber, etc., in accordance with the needs.

In the case that the adhesive layers (5) and (15) are formed in the functional film of the present invention, a surface of the adhesive layer may be protected until the time of being used by providing a release film onto the adhesive layer.

Further, the adhesive layers (5) and (15) may be formed in the functional film, by forming an adhesive layer on a separately prepared release support subjected to the release treatment, and by laminating and gluing (closely gluing) the functional film of the present invention with the release support on which the adhesive layer is formed, so that the adhesive layer is brought into contact with the functional layers (4) and (14) of the functional film. In this case, the release support is provided onto the adhesive layer at the same time of the formation of the adhesive layers (5) and (15), so that the surface of the adhesive layer is protected until the time of use.

As the adhesive for allowing the functional film having the functional layer on the support to be glued onto the object article, or for allowing the functional layer formed in releasable state on the support to be transferred and glued onto the object article, if a general adhesive or self-adhesive is used, there is a case in which the functional layer is destroyed. Namely, if the functional layer formed on the support is thin, and particularly the functional layer mainly comprises inorganic materials, the functional layer is brittle. The self-adhesive can flow. Therefore, in the case that the functional film or the functional layer is glued or transferred to be glued onto the object article using the self-adhesive, the functional layer is liable to be destroyed because the self-adhesive layer flows by locally providing force.

In the case that a liquid adhesive is used as the adhesive and cured, flowability is extinguished by curing so that the functional layer is not destroyed. However, in the case that flowability is too high such as in liquid state, it is not suitable for the adhesive layer formed in the functional film, considering handling quality of the film and others.

Therefore, the adhesives capable of providing an adhesive layer having a tacky feeling by just applying an adhesive solution and drying, and providing a very hard cured layer by sticking the adhesive layer onto the transfer-object article followed by curing the adhesive layer by ultraviolet rays, were developed. Softening or deterioration of the adhesive cured layer after sticking onto the transfer-object article and curing does not occur.

In the present invention, it is also preferable that the compressed layer of the functional fine particles is subjected to heat treatment after formation of the compressed layer of the functional fine particles and before formation of the adhesive layer. By the heat treatment, internal stress remained in the resin layer at the forming time of the compressed layer is relaxed so that corrosion resistance of the functional film against various materials or various solvents is improved.

Conditions for the heat treatment may be suitably selected. For relaxation of the internal stress, a temperature of the heat treatment is preferably 50° C. or higher, more preferably 80° C. or higher. Upper limit of the temperature of the heat treatment is, for example, normally 130° C. in the case that the resin film is used as the support. Heat treatment time is also normally in a range of 1 minute to 100 hours, preferably in a range of 10 minutes to 50 hours, further preferably in a range of 30 minutes to 25 hours. An atmosphere at the time of the heat treatment may be an atmosphere under vacuum, reduced pressure, air, nitrogen gas or inert gas such as argon.

The present invention also relates to an article provided with the functional layer (4) of the functional films of the first type and the second type described above. Examples of the layer constitution of the articles provided with the functional layer in the present invention are shown in FIG. 10 and FIG. 11.

Figure 10:
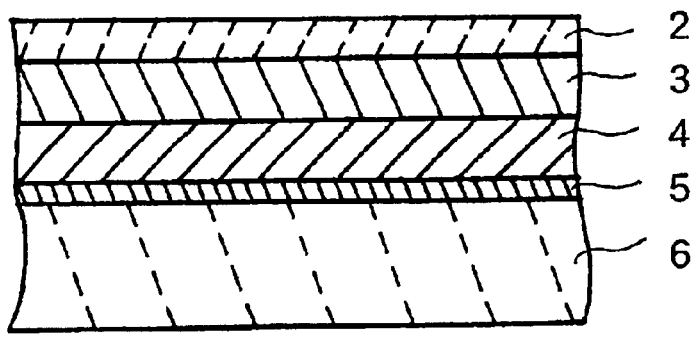
FIG. 10 is a cross-sectional view illustrating one example of the article provided with the functional layer in the present invention.

FIG. 10 is a cross-sectional view illustrating an example of the layer constitution in which the functional layer (4) is provided to a surface of the object article (6) through the adhesive layer (5). This adhesive layer (5) is derived from the adhesive layer (5) of the functional film for transfer and/or the adhesive layer formed on the object article in advance. It has the resin layer (3) and the hard-coating layer (2) on the functional layer (4). Namely, FIG. 10 illustrates an example in which the functional layer (4) is transferred using the first type functional film shown in FIG. 5 or FIG. 6.

Figure 11:
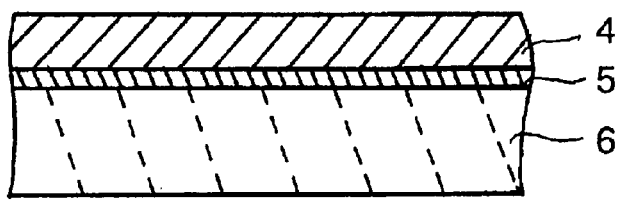
FIG. 11 is a cross-sectional view illustrating one example of the article provided with the functional layer in the present invention.

FIG. 11 is a cross-sectional view illustrating an example of the layer constitution in which the functional layer (4) is provided to a surface of the object article (6) through the adhesive layer (5). This adhesive layer (5) is derived from the adhesive layer (5) of the functional film for transfer and/or the adhesive layer formed on the object article in advance. Namely, FIG. 11 illustrates an example in which the functional layer (4) is transferred using the functional film shown in FIG. 2, or using the second type functional film shown in FIG. 3 or FIG. 4.

The article (6) as the object is not particularly limited, and may include various articles. For example, articles or supports having poor flexibility such as plate materials on which it is difficult to form coating layers with uniform thickness, articles such as glasses and ceramics on which it is difficult to directly form compressed layers, and the like, may be included. For example, a CRT surface requires treatments for such as an antistatic, an electromagnetic-wave shielding, a reflection preventing and the like, and the CRT may be mentioned as a concrete example of the object article in the present invention.

In order to obtain the article provided with the functional layer of the present invention, the functional layer (4) of the functional film described above is transferred from the support (1) to the object article (6). Namely, the functional film is stuck onto a surface of the object article through the adhesive layer of the functional film (in the case that this is formed) and/or through the adhesive layer on the object article so that the support (1) faces outside. Then, the support (1) of the functional film is released.

Figure 12:
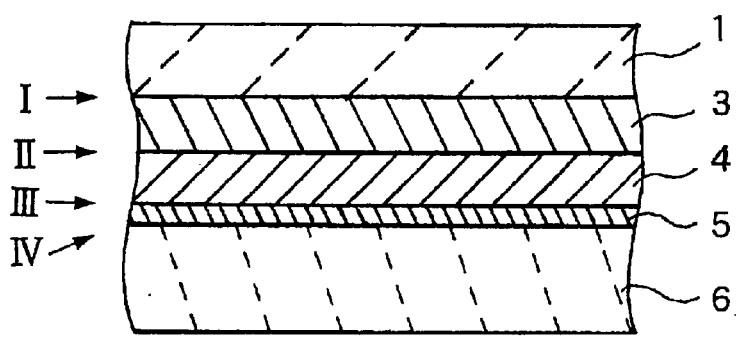
FIG. 12 is a view for describing release at the time of transfer using the functional film in the present invention.
Figure 12:
Figure 12:
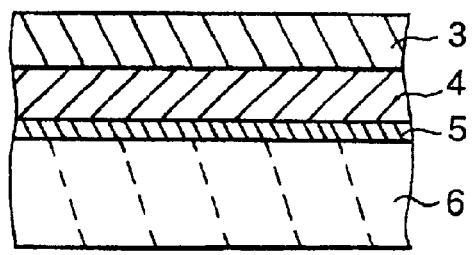
Figure 12:
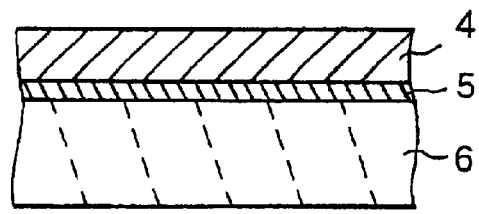

FIG. 12 is a view for describing release at the time of transfer. In FIG. 12, (a) illustrates a state in which the functional film of the first type or the second type shown in FIG. 3 is stuck onto a surface of the transfer-object article (6). Here, in the present invention, the terms "releasable" and "not to be released" are used for representing behavior of the layers at the time of transferring to the object article as described below. Therefore, the terms do not mean absolute strength of adhesion.

Relationships of each layer in the present invention will be described referring to FIG. 12 as an example. Regarding close adhesion between the resin layer (3) and the functional layer (4), it seems that a part of the functional fine particles of the functional layer (4), which contact with the resin layer (3), is embedded in the resin layer (3) by compression, so that the functional layer (4) closely glues to the resin layer (3). Therefore, close adhesive properties of both layers (3) and (4) tend to be high in the case that compression force is high, and close adhesive properties of both layers (3) and (4) are high in the case that the resin layer (3) tends to be softer. The close adhesion force varies depending on the kind, shape, particle diameter, or others of the functional file particles, and also varies depending on presence or absence, the kind, or others of the resin contained in the layer of the functional fine particles at the time of compression.

In FIG. 12, an interface between the support (1) and the resin layer (3) (referred to as an interface I), an interface between the resin layer (3) and the functional layer (4) (referred to as an interface II), an interface between the functional layer (4) and the adhesive layer (5) (referred to as an interface III), and an interface between the adhesive layer (5) and the object article (6) (referred to as an interface IV) exist. In the present invention, the invention of the first type can be achieved by lowering the close adhesive properties at the interface I in comparing with the close adhesive properties at the other interfaces. Also, the invention of the second type can be achieved by lowering the close adhesive properties at the interface II in comparing with the close adhesive properties at the other interfaces.

In order to lower the close adhesive properties at the interface I in comparing the close adhesive properties at the other interfaces, close adhesive properties of the support (1) with the resin layer (3) may be lowered. Therefore, release treatment may be applied to a surface of the support (1) at the side of the resin layer (3), so that the release occurs between the support (1) and the resin layer (3) at the time of transfer. Further, the close adhesive properties at the other interfaces may be raised. In order to raise the close adhesive properties of the resin layer (3) with the functional layer (4), the resin layer may be relatively soft.

In order to lower the close adhesive properties at the interface II in comparing the close adhesive properties at the other interfaces, the close adhesive properties of the resin layer (3) with the functional layer (4) may be lowered. According as a hardness of the resin layer (3) is relatively high, the close adhesive properties of the compressed layer with the resin layer become lower. However, if the resin layer (3) is a layer being hard such as hard-coating, the close adhesive properties become too low. Generally, it is preferable that the resin layer (3) has relatively high hardness, for example, the pencil hardness of about 2H to 4H. Further, the close adhesive properties at the other interfaces may be raised. In order to raise the close adhesive properties of the support (1) with the resin layer (3), a surface of the support (1) may be subjected to the treatment for making adhesion easy (for example, corona treatment) to raise the close adhesive properties.

At the time of releasing the support (1), in the case of the first type functional film, the release occurs between the support (1) and the soft resin layer (3) (in FIG., an arrow I). The close adhesive properties of the functional layer (4) with the soft resin layer (3) are good, so that the release does not occur between the functional layer (4) and the resin layer (3). Therefore, as shown in (b), the functional layer (4) is provided to a surface of the object article (6) through the adhesive layer (5), so that the resin layer (3) exists on the functional layer (4). As shown in FIG. 6, the first type functional film in the present invention preferably has the hard-coating layer (2), the resin layer (3), the functional layer (4) and the adhesive layer (5) in this order on the support (1), and in this case, the close adhesive properties of the support (1) with the hard-coating layer (2) is low so that the release occurs between the support (1) and the hard-coating layer (2). Therefore, as shown in FIG. 10, the functional layer (4) is provided to the surface of the object article (6) through the adhesive layer (5), so that the resin layer (3) and the hard-coating layer (2) exist on the functional layer (4).

Thus, the article (6) provided with the functional layer (4) is obtained by using the first type functional film. At the surface of the obtained article, the hard-coating layer (2) or the resin layer (3) of the functional film is exposed. The exposed resin layer (3) may be further removed depending on the usage so that the functional layer (4) is exposed. The hard-coating layer (2) after transfer also performs useful work as a protective layer of the functional layer (4).

At the time of releasing the support (1), in the case of the second type functional film, the close adhesive properties of the functional layer (4) with the hard resin layer (3) are low, so that the release occurs between the resin layer (3) and the functional layer (4) (in Fig., an arrow II). Therefore, as shown in (c), the functional layer (4) is provided to a surface of the object article (6) through the adhesive layer (5), so that a surface of the functional layer (4) is in a state of exposure. Thus, the article (6) provided with the functional layer (4) is obtained by using the second type functional film. The second type functional film is suitable in the case that exposed functional layers are intended to be provided to a surface of the articles.

The functional film of the first type or the second type can be produced by mainly selecting materials and hardness of the resin layer (3).

At the transferring time of the functional layer, the adhesive layer may be formed on a surface of the transfer-object article in advance, and the transfer-object article may be subjected to surface treatment in advance. For example, in the case that the transfer-object article is glass, its surface may be subjected to the surface treatment by means of a silane coupling agent or others.

The functional film of the present invention includes a functional film according to claim 1, wherein a resin layer is formed on the support, and the compressed layer of the functional fine particles is formed on the resin layer, whereby the compressed layer of the functional fine particles is releasable with including the resin layer from the support at the time of release, and a part of the resin layer remains on the support after releasing. This functional film belongs to the first type.

The functional film of the present invention includes a functional film according to claim 1, wherein a resin layer is formed on the support, and the compressed layer of the functional fine particles is formed on the resin layer, whereby the compressed layer of the functional fine particles is releasable without including the resin layer from the support at the time of release, and a part of the compressed layer of the functional fine particles remains on the resin layer. This functional film belongs to the second type.

The present invention also relates to an article provide with a releasable layer comprising the functional layer of the transfer functional film of the third type described above, and subjected to non-glare treatment. Examples of the layer constitution of the article provided with the functional layer in the present invention are shown in FIG. 13 and FIG. 14.

Figure 13:
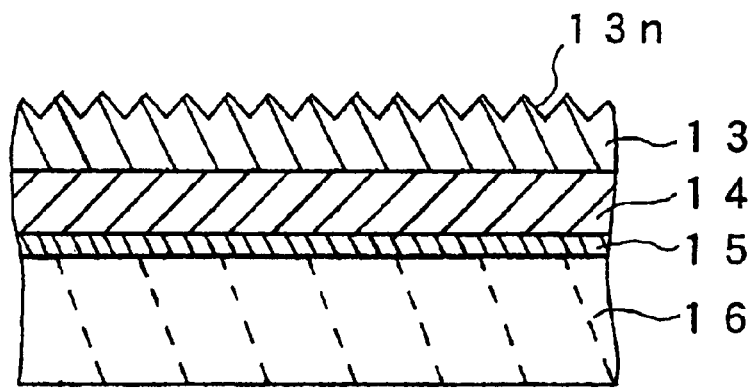
FIG. 13 is a cross-sectional view illustrating one example of the article provided with the functional layer and subjected to non-glare treatment in the present invention.

FIG. 13 is a cross-sectional view illustrating an example of the layer constitution in which the functional layer (14) is provided to a surface of the object article (16) through the adhesive layer (15), having the resin layer (13) of a non-glare surface (13n). This adhesive layer (15) is derived from the adhesive layer (15) of the functional film for transfer and/or the adhesive layer formed on the object article in advance.

Figure 14:
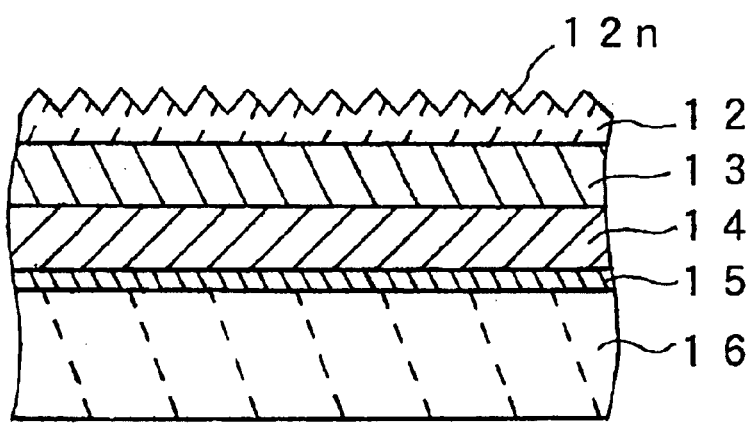
FIG. 14 is a cross-sectional view illustrating one example of the article provided with the functional layer and subjected to non-glare treatment in the present invention.

FIG. 14 is a cross-sectional view illustrating an example of the layer constitution in which the functional layer (14) is provided to a surface of the object article (16) through the adhesive layer (15), having the hard-coating layer (12) of a non-glare surface (12n). This adhesive layer (15) is derived from the adhesive layer (15) of the functional film for transfer and/or the adhesive layer formed on the object article in advance.

The article (16) as the object is not particularly limited, and includes various articles in which providing the functional layer and the non-glare treatment are required. For example, articles or supports having poor flexibility such as plate materials on which it is difficult to form a coating layer with uniform thickness, articles such as glasses and ceramics on which it is difficult to directly form a compressed layer, and the like, may be included. For example, a CRT surface requires treatments for such as an antistatic, an electromagnetic-wave shielding, a reflection preventing and the like, and the CRT may be mentioned as a concrete example of the object article in the present invention.

In order to obtain the article provided with the functional layer and subjected to non-glare treatment in the present invention, the releasable layer comprising the functional layer (14) of the functional film is transferred from the support (11) to the object article (16), so that a surface released from the support (non-glare treated surface) faces outside. Namely, the functional film is stuck onto a surface of the object article (16) by means of the adhesive layer of the functional film and/or the adhesive layer formed on the object article in advance. Then, the support (11) of the functional film is released. Thus, the article provided with the functional layer (14) and subjected to the non-glare treatment is obtained. The hard-coating layer (12) after transfer also performs useful work as a protective layer of the functional layer.

At the transferring time of the functional layer, the adhesive layer may be formed on the transfer-object article, and the transfer-object article may be subjected to the surface treatment in advance. For example, in the case that the transfer-object article is glass, its surface may be subjected to the surface treatment by means of the silane coupling agent or others.

EXAMPLES

Hereafter, the present invention will be described with reference to Examples thereof; however, the present invention is not limited to these Examples alone.

Example 1

The First Type

As shown in FIG. 6, a transfer functional film of the first type having a hard-coating layer (2), a resin layer (3), a functional layer (4) and an adhesive layer (5) in this order on a support (1) was produced.

(Formation of the Hard-coating Layer)

A silicone hard-coating liquid KP-854 (manufactured by Shin-Etsu Chemical Co., Ltd.) was applied onto a PET film (1) with a thickness of 50 $\mu$m, and the applied liquid was dried and cured at 90° C. for 2 hours to form a silicone hard-coating layer (2) with a thickness of 2.5 $\mu$m.

(Formation of the Resin Layer)

To 100 parts by weight of a silicone varnish TSR-145 (manufactured by GE Toshiba Silicones Co., Ltd.) was added 1 part by weight of a silane type curing agent CR-15 (manufactured by GE Toshiba Silicones Co., Ltd.), and further 120 parts by weight of ethanol and 80 parts by weight of toluene were added thereto to prepare a coating liquid for the resin layer. The coating liquid was applied onto a surface of the hard-coating layer (2) of the PET film, and the applied liquid was dried and cured at 90° C. for 2 hours to form the resin layer (3) with a thickness of 1 $\mu$m.

(Formation of the Functional Layer)

To 100 parts by weight of ITO fine particles SUFP-HX having a primary particle diameter of 5 to 30 nm (manufactured by Sumitomo Metal Mining Co., Ltd.) were added 300 parts by weight of ethanol, and dispersion was carried out by means of a dispersion machine with the use of zirconia beads as a medium. The obtained coating liquid was applied onto the resin layer (3) by means of a bar coater and dried by supplying hot air of 50° C. The obtained film will be hereafter referred to as an ITO film before compression. The ITO-containing coating layer had a thickness of 1.7 μm.

First, a preliminary experiment for confirming compression pressure was carried out.

By means of a roll press machine equipped with a pair of metal rolls having a diameter of 140 mm (whose roll surface had been subjected to hard chromium plating treatment), the aforesaid ITO film before compression was sandwiched and compressed at room temperature (23° C.) without rotating the rolls and without heating the rolls. At this time, the pressure per unit length in the film width direction was 660 N/mm. Next, the pressure was released and the length of the compressed part in the film length direction was examined and found out to be 1.9 mm. From this result, it is found out that the film had been compressed by a pressure of 347 N/mm$^2$ per unit area.

Next, the aforesaid ITO film before compression, which was the same one as used in the preliminary experiment, was sandwiched between the metal rolls and compressed under the aforesaid condition, and the rolls were rotated to compress the film at a feeding speed of 5 m/min. Thus, a compressed ITO film was obtained. The ITO compressed layer (4) had a thickness of 1.0 μm.

(Heat Treatment)

The aforesaid ITO film after compression was placed in an atmosphere of 100° C. for 2 hours.

(Electric Resistance)

Before formation of the adhesive layer, electric resistance of the ITO compressed-layer (4) was measured. The film having the ITO compressed layer (4) formed thereon was cut into a size of 50 mm×50 mm. The electric resistance was measured by applying a tester to two points on diagonally positioned corners and was found out to be 1 kΩ.

(Formation of the Adhesive Layer)

To 100 parts by weight of an acrylic resin 103B (Tg: about 40° C., concentration of solid components: 50%; manufactured by Taisei Chemical Industries, Ltd.) were added 50 parts by weight of GPO-303 (manufactured by Nippon Kayaku Co., Ltd.), 183 parts by weight of toluene, and 1 part by weight of a photopolymerization initiator KAYACURE DETX-S (manufactured by Nippon Kayaku Co., Ltd.) to prepare a coating liquid for the adhesive layer. The coating liquid was applied onto the compressed layer (4) of the aforesaid ITO film which had been subjected to the heat treatment, and dried to form the adhesive layer (5) with a thickness of 20 μm. When the adhesive layer (5) was touched with a finger, the layer had a tacky feeling. Thus, the functional film was obtained.

(Providing the Functional Layer to a Glass Plate)

First, surface treatment of glass plate as an object was performed. To 100 parts by weight of a silane coupling agent KBM503 (manufactured by Shin-Etsu Chemical Co., Ltd.) were added 0.9 parts by weight of acetic acid (1N) and 21 parts by weight of water to perform hydrolysis. To 1 part by weight of the hydrolyzed silane coupling agent was added 100 parts by weight of ethanol to prepare a liquid for the surface treatment. The liquid for the surface treatment was applied by means of an applicator onto the glass plate and dried. The glass plate was placed in an atmosphere of 110° C. for 5 minutes to allow the silane coupling agent to be reacted with the glass. Thereafter, excess of the silane coupling agent on the glass plate was wiped off by a cloth in which ethanol was included.

Next, the obtained functional film was stuck onto the glass plate by means of a laminator so that the adhesive layer (5) was brought into contact with the glass plate which had been subjected to the surface treatment. Ultraviolet rays were irradiated so that the adhesive layer (5) was cured. The support PET film (1) was peeled off. The adhesive layer (5) was greatly firm. Thus, as shown in FIG. 10, the ITO compressed layer (4) was provided to the glass plate (6) through the adhesive layer (5).

(Scratch Properties)

The ITO compressed layer (4) on the glass plate (6) was scratched with a nail, but the compressed layer was not peeled off.

(Laminating with a Release Film)

Separately, a release film was laminated on a surface of the adhesive layer (5) of the functional film obtained by formation of the adhesive layer. Thereafter, the laminated release film was peeled off, but migration of the adhesive to the release film was not observed.

Example 2

The First Type

The object article was changed from the glass plate in Example 1 to a polycarbonate plate (with a thickness of 5 mm). The surface treatment by means of the silane coupling agent was not performed.

The functional film obtained in Example 1 was stuck onto the polycarbonate plate in the same manner as in Example 1 so that the ITO compressed layer was provided.

Example 3

The First Type, Exposure After Providing the Functional Layer

As shown in FIG. 4, a transfer functional film of the first type having a resin layer (3), a functional layer (4) and an adhesive layer (5) in this order on a support (1) was produced.

(Formation of the Resin Layer)

To 100 parts by weight of the acrylic resin 103B (manufactured by Taisei Chemical Industries, Ltd.; concentration of solid components: 50%) were added 400 parts by weight of methyl ethyl ketone to prepare a coating liquid. The coating liquid was applied onto a PET film (1) with a thickness of 75 μm (HSL; manufactured by Teijin DuPont Films Co., Ltd.) and dried to form an acrylic resin layer (3) with a thickness of 1.0 μm.

(Formation of the Functional Layer)

An ITO compressed layer (4) with a thickness of 1.0 μm was formed on the acrylic resin layer (3) in the same manner as in Example 1.

(Formation of the Adhesive Layer)

To 100 parts by weight of the acrylic resin 103B (Tg: about 40° C., concentration of solid components: 50%; manufactured by Taisei Chemical Industries, Ltd.) were added and mixed 50 parts by weight of a UV curable resin SD318 and 183 parts by weight of methyl ethyl ketone to prepare a coating liquid for the adhesive layer.

First, the coating liquid for the adhesive layer was applied onto a release PET film S314 (manufactured by Teijin DuPont Films Co., Ltd.) which had been subjected to silicone treatment, and dried to form the adhesive layer on the release PET film.

Next, the film having the ITO compressed layer (4) formed thereon and the release PET film having the adhesive layer formed thereon were laminated together so that the ITO compressed layer (4) was brought into contact with the adhesive layer. Thus, the adhesive layer (5) was formed on the ITO compressed layer (4) to prepare the functional film for transfer. The release PET film is not shown in FIG. 4.
(Providing the Functional Layer to a Glass Plate)

A surface of a glass plate as an object was treated with the silane coupling agent in the same manner as in Example 1. The release PET film of the functional film for transfer was peeled off, and the functional film for transfer was stuck onto the glass plate by means of a laminator so that the adhesive layer (5) was brought into contact with the glass plate which had been subjected to the surface treatment. Ultraviolet rays were irradiated to cure the adhesive layer (5), and the support PET film (1) was peeled off.
(Removal of the Acrylic Resin Layer)

The glass plate having the ITO layer formed thereon was soaked into a container in which methyl ethyl ketone had been poured for 3 minutes. Thereafter, the glass plate was taken out and wiped by gauze in which methyl ethyl ketone was included to remove the acrylic resin layer (3), and methyl ethyl ketone was dried off. Thus, the ITO compressed layer (4) was exposed.
(Measurement of Electric Resistance)

The glass plate on which the ITO compressed layer (4) was exposed was cut into a size of 50 mm×50 mm. The electric resistance was measured by applying a tester to two points on diagonally positioned corners and was found out to be 1 kΩ.

Example 4

The First Type, Exposure After Providing the Functional Layer

As shown in FIG. 3, a transfer functional film of the first type having a resin layer (3) and a functional layer (4) in this order on a support (1) was produced.
(Formation of the Resin Layer)

To 100 parts by weight of the acrylic resin 103B (manufactured by Taisei Chemical Industries, Ltd.; concentration of solid components: 50%) were added 400 parts by weight of methyl ethyl ketone to prepare a coating liquid. The coating liquid was applied onto a PET film (1) with a thickness of 75 μm (HSL; manufactured by Teijin DuPont Films Co., Ltd.) and dried to form an acrylic resin layer (3) with a thickness of 0.5 μm.
(Formation of the Functional Layer)

An ITO compressed layer (4) with a thickness of 1.0 μm was formed on the acrylic resin layer (3) in the same manner as in Example 1. Thus, the functional film for transfer was obtained.
(Formation of an Adhesive Layer on an Object PET Film)

As an object article, a PET film with a thickness of 188 μm (HPE; manufactured by Teijin DuPont Films Co., Ltd.) was used.

To 100 parts by weight of the acrylic resin 103B (Tg: about 40° C., concentration of solid components: 50%; manufactured by Taisei Chemical Industries, Ltd.) were added and mixed 50 parts by weight of the UV curable resin SD318 and 183 parts by weight of methyl ethyl ketone to prepare a coating liquid for an adhesive layer.

The coating liquid for the adhesive layer was applied onto a surface, treated for making adhesion easy, of the PET film HPE with a thickness of 188 μm (manufactured by Teijin DuPont Films Co., Ltd.) which had been subjected to treatment for making adhesion easy, and dried to form the adhesive layer on the PET film.
(Providing the Functional Layer to the Object PET Film)

The functional film for transfer and the PET film having the adhesive layer formed thereon were laminated together so that the ITO compressed layer (4) was brought into contact with the adhesive layer. Ultraviolet rays were irradiated to cure the adhesive layer, and the support PET film (1) was peeled off.
(Removal of the Acrylic Resin Layer)

The PET film having the ITO layer formed thereon was soaked into a container in which methyl ethyl ketone was poured for 1 minute. Thereafter, the PET film was taken out and wiped by gauze in which methyl ethyl ketone was included to remove the acrylic resin layer (3), and methyl ethyl ketone was dried off. Thus, the ITO compressed layer (4) was exposed.
(Measurement of Electric Resistance)

The PET film on which the ITO compressed layer (4) was exposed was cut into a size of 50 mm×50 mm. The electric resistance was measured by applying a tester to two points on diagonally positioned corners and was found out to be 1 kΩ.

Example 5

The Second Type

As shown in FIG. 4, a transfer functional film of the second type having a resin layer (3), a functional layer (4) and an adhesive layer (5) in this order on a support (1) was produced.
(Formation of the Resin Layer)

As a hard resin layer, a silicone resin was used. A liquid A (100 parts by weight) and a liquid B (300 parts by weight) of FRESCERA-N (manufactured by Matsushita Electric Works, Ltd.) were mixed together to prepare a coating liquid for the resin layer. After a PET film (1) with a thickness of 75 μm (HSL; manufactured by Teijin DuPont Films Co., Ltd.) was subjected to corona treatment, the coating liquid was applied onto the film (1), dried and cured at 70° C. for 24 hours to form a silicone resin layer (3) with a thickness of 0.7 μm.
(Formation of the Functional Layer)

An ITO compressed layer (4) with a thickness of 1.0 μm was formed on the silicone resin layer (3) using ITO fine particles having a primary particle diameter of 10 to 30 nm (manufactured by Dowa Kogyo Co., Ltd.) in the same manner as in Example 1.
(Heat Treatment)

An ITO film after formation of the ITO compressed layer was placed in an atmosphere of 70° C. for 1 hour.
(Formation of the Adhesive Layer)

To 100 parts by weight of an acrylic resin 1BR-305 (solid components: 39.5%; manufactured by Taisei Chemical Industries, Ltd.) were added 120 parts by weight of an ultraviolet curable type hard-coating liquid UVHC1101 (manufactured by GE Toshiba Silicones Co., Ltd.) and 312 parts by weight of methyl ethyl ketone to prepare a coating liquid for the adhesive layer. The coating liquid was applied onto the compressed layer (4) of the ITO film which had been subjected to the heat treatment, and dried to form the adhesive layer (5) with a thickness of 10 μm.
(Providing the Functional Layer to a Polycarbonate Plate)

The obtained functional film was stuck onto a polycarbonate pate (with a thickness of 2 mm) by means of a laminator so that the adhesive layer (5) was brought into contact with the polycarbonate plate. Ultraviolet rays were irradiated to cure the adhesive layer (5). The support PET film (1) was peeled off. The silicone resin layer (3) was peeled off together with the PET film (1), and the ITO compressed layer (4) was exposed. Thus, as shown in FIG. 7, the ITO compressed layer (4) was provided to the polycarbonate plate (6) through the adhesive layer (5).

(Electric Resistance)

The polycarbonate plate provided with the ITO compressed layer (4) was cut into a size of 50 mm×50 mm. The electric resistance was measured by applying a tester to two points on diagonally positioned corners and was found out to be 3 kΩ.

Example 6

The Second Type, Patterning of the ITO Compressed Layer

This Example is an example for usage in a contact resistance system matrix type touch panel. The transfer functional film produced in Example 5, namely the transfer functional film having the silicone resin layer (3), the ITO compressed layer (4) and the adhesive layer (5) in this order on the PET film support (1) shown in FIG. 4, was used.

(Patterning of the ITO Compressed Layer to a Glass Plate)

The surface treatment of a glass plate as an object was performed using the silane coupling agent KBM503 (Shin-Etsu Chemical Co., Ltd.) in the same manner as in Example 1.

Figure 15:
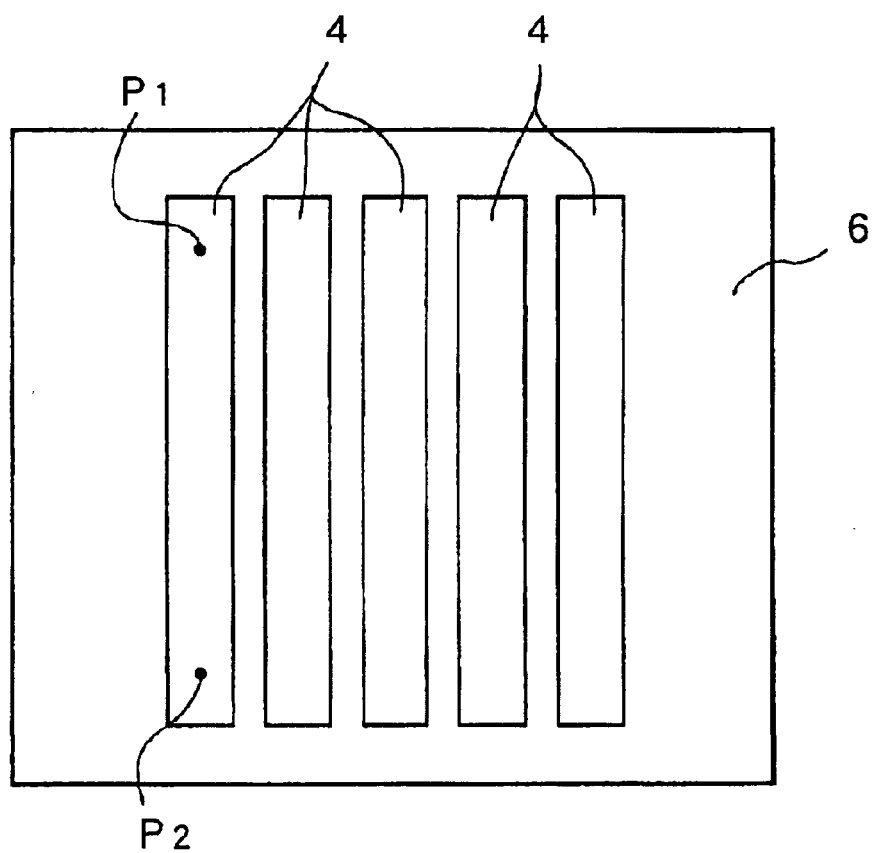
FIG. 15 is a horizontal projection illustrating one example of the article on which the functional layer of the present invention is subjected to patterning.

The functional film for transfer was cut into a tape form with a width of 4 mm, and the obtained tape form-functional film was cut into a length of 10 cm to obtain five tapes. These five tapes were stuck in parallel onto the glass by means of a laminator, so that the mutual distance between five tapes was to be 2 mm (namely, with a 6 mm pitch) and the adhesive layer (5) was brought into contact with the glass plate which had been subjected to the surface treatment. Ultraviolet rays were irradiated to cure the adhesive layer (5). The support PET film (1) was peeled off. The silicone resin layer (3) was peeled off together with the PET film (1), so that the ITO compressed layer (4) was exposed. Thus, as shown in FIG. 15, the patterning of the ITO compressed layer (4) on the glass plate (6) through the adhesive layer (5) was accomplished.

(Electric Resistance)

The electric resistance was measured by applying a tester to two points, (P1) and (P2), positioned in longitudinal direction at apart by 1 cm each of both ends and on the center in width direction (namely, distance of each tester is 8 cm) of each ITO compressed layer (4). For any of the ITO compressed layers (4), electric resistance was found out to be 15 kΩ. Also, there is no continuity between the five ITO compressed layers with each other.

Example 7 the Third Type, Non-glare Treatment

As shown in FIG. 9, a transfer functional film having a hard-coating layer (12), a resin layer (13), a functional layer (14) and an adhesive layer (15) in this order on a non-glare treated surface of a support (11) was produced.

(Formation of the Hard-Coating Layer)

As a support having a non-glare surface, a PET film U4 (manufactured by Teijin DuPont Films Co., Ltd.) was used.

A silicone hard-coating liquid KP-854 (manufactured by Shin-Etsu Chemical Co., Ltd.) was applied onto the non-glare surface of the PET film U4 (11) with a thickness of 50 μm, dried and cured at 90° C. for 2 hours to form a silicone hard-coating layer (12).

(Formation of the Resin Layer)

To 100 parts by weight of the silicone varnish TSR-145 (manufactured by GE Toshiba Silicones Co., Ltd.) were added 1 part by weight of the silane type curing agent CR-15 (GE Toshiba Silicones Co., Ltd.), and further 120 parts by weight of ethanol and 80 parts by weight of toluene were added thereto to prepare a coating liquid for the resin layer. The coating liquid was applied onto a surface of the hard-coating layer (12) of the PET film, dried and cured at 90° C. to form the resin layer (13) with a thickness of 1 μm.

(Formation of the Functional Layer)

To 100 parts by weight of the ITO fine particles SUFP-HX having a primary particle diameter of 5 to 30 nm (manufactured by Sumitomo Metal Mining Co., Ltd.) were added 300 parts by weight of ethanol, and dispersion was carried out by means of a dispersion machine with the use of zirconia beads as a medium. The obtained coating liquid was applied onto the resin layer (13) by means of a bar coater and dried by supplying hot air of 50° C. The obtained film will be hereafter referred to as an ITO film before compression. The ITO-containing coating layer had a thickness of 1.7 μm.

First, a preliminary experiment for confirming compression pressure was carried out.

By means of a roll press machine equipped with a pair of metal rolls having a diameter of 140 mm (whose roll surface had been subjected to hard chromium plating treatment), the aforesaid ITO film before compression was sandwiched and compressed at room temperature (23° C.) without rotating the rolls and without heating the rolls. At this time, the pressure per unit length in the film width direction was 660 N/mm. Next, the pressure was released and the length of the compressed part in the film length direction was examined and found out to be 1.9 mm. From this result, it is found out that the film had been compressed by a pressure of 347 N/mm$^2$ per unit area.

Next, the aforesaid ITO film before compression, which was the same one as used in the preliminary experiment, was sandwiched between the metal rolls and compressed under the aforesaid condition, and the rolls were rotated to compress the film at a feeding speed of 5 m/min. Thus, a compressed ITO film was obtained. The ITO compressed layer (14) had a thickness of 1.0 μm.

(Heat Treatment)

The ITO film after compression was placed in an atmosphere of 100° C. for 2 hours.

(Electric Resistance)

Before formation of the adhesive layer, electric resistance of the ITO compressed layer (14) was measured. The film having the ITO compressed layer (14) formed thereon was cut into a size of 50 mm×50 mm. The electric resistance was measured by applying a tester to two points on diagonally positioned corners and was found out to be 1 kΩ.

(Formation of the Adhesive Layer)

To 100 parts by weight of the acrylic resin 103B (manufactured by Taisei Chemical Industries, Ltd.) were added 50 parts by weight of GPO-303 (manufactured by Nippon Kayaku Co., Ltd.), 183 parts by weight of toluene, and 1 part by weight of KAYACURE DETX-S (manufactured by Nippon Kayaku Co., Ltd.) to prepare a coating liquid for the adhesive layer. The coating liquid was applied onto the compressed layer (14) of the ITO film which had been subjected to the heat treatment, and dried to form the adhesive layer (15) with a thickness of 20 μm. When the adhesive layer (15) was touched with a finger, the layer had a tacky feeling. Thus, the functional film for transfer was obtained.

(Transfer to a Glass Plate)

First, surface treatment of a glass plate as an object was performed. To 100 parts by weight of the silane coupling agent KBM503 (manufactured by Shin-Etsu Chemical Co., Ltd.) were added 0.9 parts by weight of acetic acid (1N) and 21 parts by weight of water to perform hydrolysis. To 1 part by weight of the hydrolyzed silane coupling agent were added 100 parts by weight of ethanol to prepare a liquid for the surface treatment. The liquid for the surface treatment was applied by means of an applicator onto the glass plate and dried. The glass plate was placed in an atmosphere of 110° C. for 5 minutes to allow the silane coupling agent to be reacted with the glass. Thereafter, excess of the silane coupling agent on the glass plate was wiped off by a cloth in which ethanol was included.

Next, the obtained functional film was stuck onto the glass plate by means of a laminator so that the adhesive layer (15) was brought into contact with the glass plate which had been subjected to the surface treatment. Ultraviolet rays were irradiated to cure the adhesive layer (15). The support PET film (11) was peeled off. Thus, as shown in FIG. 14, the ITO compressed layer (14) was provided to the glass plate (16) through the adhesive layer (15), and the hard-coating layer (12) having the non-glare surface was exposed.

(Measurement of Reflective Properties)

A surface, which had not been subjected to the non-glare treatment, of the glass plate (16) which had been subjected to the non-glare treatment was painted with black ink by means of a black oil pen. Reflected light was measured by means of a spectrophotometer V-570. (manufactured by JASCO Corporation) combined with an integrating sphere (manufactured by JASCO Corporation). The glass plate (16) was set on the integrating sphere, so that the surface which had been subjected to the non-glare treatment faced to the light (the non-glare treated surface faced to the integrating sphere side). Reflectance of all reflected light at wave length of 550 nm was found out to be 4.7%. Next, reflectance except light of specular reflection at wave length of 550 nm (namely, reflectance of scattering light) was measured and found out to be 2.4%. At least half reflected light was scattered, and reflection of external light could be reduced.

(Comparison of Reflective Properties)

For comparison, reflective properties of a glass plate which had not been subjected to the surface treatment was measured.

One surface of the glass plate was painted with black ink by means of a black oil pen. The glass plate was set on the integrating sphere, so that the surface which was not painted with black ink faced to the light (a glass surface faced to the integrating sphere). Reflectance of all reflected light at wave length of 550 nm was found out to be 4.8%. Next, reflectance except light of specular reflection at wave length of 550 nm (namely, reflectance of scattering light) was measured and found out to be 0.1%. Most reflected light was not scattered and was the light of specular reflection, and reflection of external light was strong.

In Examples described above, examples in which the transfer functional film having the transparent conductive layer was produced using the ITO fine particles as inorganic fine particles were described. In the same manner as in Examples described above, transfer functional films having various inorganic functional layers can be produced using inorganic fine particles having various properties. Of course, as the object article, various articles in which providing functional layers is required, or various articles in which providing functional layers and non-glare treatment are required, may be selected. Therefore, the foregoing Examples are in all aspects illustrative only and must not be construed as being restrictive. Further, all changes that fall within the range of equivalence of the claims are intended to be embraced within the scope of the present invention.

What is claimed is:

1. A process for producing a functional film which comprises:
   forming a layer containing functional fine particles on a support; and
   compressing said layer containing said functional fine particles at a compression force of at least 44 N/mm² to form a functional layer which is a compressed layer of said functional fine particles in releasable state from said support.

2. The process of claim 1, further comprising the step of:
   forming a releasable layer on the substrate;
   wherein the compressed layer of the functional fine particles is formed on the releasable layer; and
   whereby the releasable layer is releasable together with the compressed layer of the functional fine particles from the support.

3. The process of claim 2, wherein the releasable layer comprises a resin layer containing a resin as a main component.

4. The process of claim 3, wherein the releasable layer comprises a hard-coating layer formed on the support and the resin layer formed on the hard-coating layer, said hard-coating layer having a pencil hardness of greater than 4H.

5. The process of claim 1, further comprising the step of:
   forming a base layer on the support;
   wherein the compressed layer of the functional fine particles is formed on the base layer; and
   whereby the compressed layer of the functional fine particles is releasable from the base layer.

6. The process of claim 5, wherein the base layer comprises a resin layer containing a resin as a main component.

7. The process of claim 1, further comprising the step of:
   treating a surface of the support at the side of the functional layer with a non-glare treatment.

8. The process of claim 7, further comprising the step of:
   forming a releasable layer on the substrate;
   wherein the compressed layer of the functional fine particles is formed on the releasable layer; and
   whereby the releasable layer is releasable together with the compressed layer of the functional fine particles from the support.

9. The process of claim 8, wherein the releasable layer comprises a resin layer containing a resin as a main component.

10. The process of claim 9, wherein the releasable layer comprises a hard-coating layer formed on the support and the resin layer formed on the hard-coating layer.

11. The process of claim 1, wherein the compressed layer of the functional fine particles is obtained by the steps of:
    applying a liquid in which the functional fine particles are dispersed onto the support or the resin layer followed by drying to form a layer containing the functional fine particles, and
    compressing the layer containing the functional fine particles.

12. The process of claim 1, wherein the compressed layer of the functional fine particles is a transparent conductive layer.

13. The process of claim 1, further comprising the step of:
    forming an adhesive layer on the compressed layer of the functional fine particles.

14. The process of claim 13, wherein the adhesive layer is composed of an adhesive composition comprising a polymer resin component (P) having a glass transition temperature Tg of 30 C. or higher and a curable low molecular weight component (M) in a weight ratio P/M of 8/2 to 2/8.

15. The process of claim 14, wherein the polymer resin component (P) used in the adhesive composition is a solid at an ambient temperature and the curable low molecular weight component (M) to be used in the adhesive composition is a liquid at an ambient temperature.

16. The process according to claim 14, wherein the polymer resin component (P) to be used in the adhesive composition is an acrylic resin and the curable low molecular weight component (M) to be used in the adhesive composition is an acrylic monomer.

17. The process of claim 14, wherein a photopolymerization initiator is further contained in the adhesive composition.

18. The process of claim 14, further comprising the step of curing the adhesive composition using light irradiation.

* * * * *

UNITED STATES PATENT AND TRADEMARK OFFICE
CERTIFICATE OF CORRECTION

PATENT NO. : 6,797,210 B2
DATED : September 28, 2004
INVENTOR(S) : Tadayoshi Iijima It is certified that error appears in the above-identified patent and that said Letters Patent is hereby corrected as shown below:

Title page,
Item [54], Title, should be read as
-- FUNCTIONAL FILM HAVING FUNCTIONAL LAYER AND ARTICLE PROVIDED WITH THE FUNCTIONAL LAYER --.

Signed and Sealed this

Fifth Day of April, 2005

JON W. DUDAS
*Director of the United States Patent and Trademark Office*